(12) United States Patent
Birkland et al.

(10) Patent No.: US 11,718,304 B2
(45) Date of Patent: *Aug. 8, 2023

(54) METHOD AND SYSTEM FOR ESTIMATING SURFACE ROUGHNESS OF GROUND FOR AN OFF-ROAD VEHICLE TO CONTROL AN IMPLEMENT

(71) Applicant: Deere & Company, Moline, IL (US)

(72) Inventors: Christopher D. Birkland, Indianola, IA (US); Tyler D. Schleicher, Ankeny, IA (US)

(73) Assignee: Deere & Comoanv, Moline, IL (US)

( * ) Notice: Subject to any disclaimer, the term of this patent is extended or adjusted under 35 U.S.C. 154(b) by 341 days.

This patent is subject to a terminal disclaimer.

(21) Appl. No.: 16/946,813

(22) Filed: Jul. 7, 2020

(65) Prior Publication Data
US 2021/0276565 A1 Sep. 9, 2021

Related U.S. Application Data

(60) Provisional application No. 62/986,012, filed on Mar. 6, 2020.

(51) Int. Cl.
| | | |
|---|---|---|
| *B60W 40/06* | (2012.01) | |
| *B60W 30/02* | (2012.01) | |
| *B62D 37/02* | (2006.01) | |

(52) U.S. Cl.
CPC ............ *B60W 40/06* (2013.01); *B60W 30/02* (2013.01); *B62D 37/02* (2013.01);
(Continued)

(58) Field of Classification Search
None
See application file for complete search history.

(56) References Cited

U.S. PATENT DOCUMENTS

| | | |
|---|---|---|
| 7,272,474 B1 | 9/2007 | Stentz et al. |
| 8,265,826 B2 | 9/2012 | Feller et al. |

(Continued)

FOREIGN PATENT DOCUMENTS

| | | |
|---|---|---|
| AU | 2013303992 A1 | 4/2015 |
| CN | 103196823 A | 7/2013 |

(Continued)

OTHER PUBLICATIONS

Extended European Search Report and Written Opinion issued in European Patent Application No. 21154632.0, dated Jul. 20, 2021, in 07 pages.

(Continued)

*Primary Examiner* — Mahmoud S Ismail

(57) ABSTRACT

A method and system for estimating surface roughness of a ground for an off-road vehicle to control an implement comprises detecting motion data of an off-road vehicle traversing a field or work site during a sampling interval. A first sensor is adapted to detect pitch data of the off-road vehicle for the sampling interval to obtain a pitch acceleration. A second sensor is adapted to detect roll data of the off-road vehicle for the sampling interval to obtain a roll acceleration. An electronic data processor or surface roughness index module determines or estimates a surface roughness index based on the detected motion data, pitch data and roll data for the sampling interval. The surface roughness index can be displayed on the graphical display to a user or operator of the vehicle.

20 Claims, 12 Drawing Sheets

(52) U.S. Cl.
CPC ... *B60W 2300/185* (2013.01); *B60W 2400/00* (2013.01); *B60W 2520/14* (2013.01); *B60W 2520/16* (2013.01); *B60W 2520/18* (2013.01)

(56) References Cited

U.S. PATENT DOCUMENTS

| | | |
|---|---|---|
| 8,340,438 B2 | 12/2012 | Anderson |
| 9,516,802 B2 | 12/2016 | Zemenchik |
| 9,615,501 B2 | 4/2017 | Pickett et al. |
| 9,693,496 B2 | 7/2017 | Tevs et al. |
| 9,708,001 B2 | 7/2017 | Arakane et al. |
| 9,740,208 B2 | 8/2017 | Sugumaran et al. |
| 10,114,376 B2 | 10/2018 | Kini et al. |
| 10,119,830 B2 | 11/2018 | Sakai et al. |
| 10,126,136 B2 | 11/2018 | Iagnemma |
| 10,219,421 B2 | 3/2019 | Achen et al. |
| 10,398,096 B2 | 9/2019 | Hassanzadeh et al. |
| 10,408,645 B2 | 9/2019 | Blank et al. |
| 10,448,555 B2 | 10/2019 | Foster et al. |
| 10,800,423 B2 | 10/2020 | Schleicher |
| 10,962,982 B2 | 3/2021 | Fridman |
| 10,981,573 B2 | 4/2021 | Herrera |
| 10,988,142 B1 | 4/2021 | Mehrotra et al. |
| 11,029,681 B2 | 6/2021 | Rulseh et al. |
| 2003/0055549 A1 | 3/2003 | Barta et al. |
| 2008/0269988 A1 | 10/2008 | Feller et al. |
| 2011/0077028 A1 | 3/2011 | Wilkes, III et al. |
| 2013/0032363 A1 | 2/2013 | Curry et al. |
| 2015/0088381 A1 | 3/2015 | Imamura et al. |
| 2015/0088802 A1 | 3/2015 | Jeon et al. |
| 2015/0237795 A1 | 8/2015 | Koch et al. |
| 2016/0029547 A1 | 2/2016 | Casper et al. |
| 2016/0031444 A1 | 2/2016 | Fairgrieve et al. |
| 2016/0334798 A1 | 11/2016 | Foster et al. |
| 2017/0309093 A1 | 10/2017 | Feng |
| 2017/0363430 A1 | 12/2017 | Al-Dahle et al. |
| 2018/0220577 A1* | 8/2018 | Posselius ............ A01B 79/005 |
| 2019/0031231 A1 | 1/2019 | George |
| 2019/0047573 A1* | 2/2019 | Herrera ............... B60W 40/109 |
| 2019/0079539 A1 | 3/2019 | Sridhar et al. |
| 2019/0129435 A1 | 5/2019 | Madsen et al. |
| 2019/0183036 A1* | 6/2019 | Leimkuehler .......... A01C 5/062 |
| 2019/0256102 A1 | 8/2019 | Schleicher |
| 2019/0387658 A1 | 12/2019 | Henry |
| 2020/0005474 A1 | 1/2020 | Ferrari et al. |
| 2020/0029489 A1 | 1/2020 | Bertucci et al. |
| 2020/0037491 A1* | 2/2020 | Schoeny ............ A01C 21/007 |
| 2020/0063401 A1 | 2/2020 | Sherlock |
| 2020/0079381 A1 | 3/2020 | Lombrozo et al. |
| 2020/0270824 A1 | 8/2020 | Nagayama et al. |
| 2020/0285228 A1 | 9/2020 | Rulseh et al. |
| 2020/0317018 A1 | 10/2020 | Nong |
| 2020/0393566 A1 | 12/2020 | Zeng et al. |
| 2021/0048290 A1* | 2/2021 | Henry .................. A01B 79/005 |
| 2021/0055740 A1 | 2/2021 | Sridhar et al. |
| 2021/0188284 A1 | 6/2021 | Hassel et al. |
| 2021/0261157 A1 | 8/2021 | Pazhayampallil et al. |
| 2021/0274700 A1* | 9/2021 | Birkland ............... B60W 40/06 |
| 2021/0276565 A1 | 9/2021 | Birkland et al. |
| 2021/0282310 A1* | 9/2021 | Birkland ............ B60W 40/068 |
| 2021/0283973 A1* | 9/2021 | Birkland ............... B60W 40/06 |
| 2021/0284171 A1* | 9/2021 | Birkland ............ B60W 30/143 |
| 2021/0284172 A1* | 9/2021 | Birkland ............. B60W 40/112 |

FOREIGN PATENT DOCUMENTS

| | | |
|---|---|---|
| CN | 203259455 U | 10/2013 |
| CN | 112519785 A | 3/2021 |
| CN | 114787014 A | 7/2022 |
| DE | 19537257 A1 | 4/1996 |
| DE | 19844090 A1 | 4/1999 |
| DE | 10107862 A1 | 9/2002 |
| EP | 1203928 A1 | 5/2002 |
| EP | 2218621 A1 | 8/2010 |
| EP | 3357316 A1 | 8/2018 |
| EP | 3527057 A1 | 8/2019 |
| EP | 3878255 A1 | 9/2021 |
| EP | 3878256 A1 | 9/2021 |
| EP | 3878257 A1 | 9/2021 |
| EP | 3878258 A1 | 9/2021 |
| JP | H1062311 A | 3/1998 |
| JP | H11189063 A | 7/1999 |
| JP | 2000131043 A | 5/2000 |
| JP | 2021165055 A | 10/2021 |
| WO | WO2014027111 A1 | 2/2014 |
| WO | WO2014189059 A1 | 11/2014 |
| WO | WO2019142868 A1 | 7/2019 |
| WO | WO2020116352 A1 | 6/2020 |

OTHER PUBLICATIONS

Extended European Search Report and Written Opinion issued in European Patent Application No. 21154633.8, dated Jul. 20, 2021, in 08 pages.

USPTO Non-Final Office Action issued in Utility U.S. Appl. No. 16/946,849 dated Sep. 21, 2021.

USPTO Non-Final Office Action issued in Utility U.S. Appl. No. 16/946,633 dated Jun. 30, 2022.

USPTO Non-Final Office Action issued in Utility U.S. Appl. No. 16/946,629 dated May 19, 2022.

Badua et al., Influence of Planter Downforce Setting and Ground Speed on Seeding Depth and Plant Spacing Uniformity of Corn, 14th International Conference on Precision Agriculture, Jun. 24-Jun. 27, 2018, pp. 1-13, Montreal, Quebec, Canada.

Ciampitti, Ignacio, and Lucas Haag. "Planter Downforce Technology for Uniform Seeding Depth." Kansas State University Agricultural Experiment Station and Cooperative Extension Service. Mar. 2017. Retrieved Jul. 6, 2020. Retrieved from the Internet: < https://bookstore.ksre.ksu.edu/pubs/MF3331.pdf>.

* cited by examiner

S207
ESTIMATE ZONES WITH CORRESPONDING SURFACE ROUGHNESS INDEX RANGES WITHIN A FIELD OR WORKSITE BASED ON THE DETERMINED SURFACE ROUGHNESS INDEX AS A VEHICLE TRAVERSES THE FIELD OR WORKSITE OVER MULTIPLE SAMPLING INTERVALS.

S210
DETERMINE A POSITION OF A VEHICLE OR ITS IMPLEMENT (E.G., GROUND-ENGAGING IMPLEMENT) IN THE WORKSITE OR FIELD, WITH RESPECT TO THE ESTIMATED ZONES.

S211
COLLECT IMAGE DATA OF THE FIELD OR WORKSITE IN A FORWARD FIELD OF VIEW OF THE VEHICLE.

S213
ESTIMATE A VISUAL SURFACE ROUGHNESS INDEX FOR THE COLLECTED IMAGE DATA WITHIN THE FIELD OF VIEW TO ESTABLISH TRANSITION REGION BETWEEN DIFFERENT ESTIMATED DOWNFORCE SETTING ZONES.

S216
PRIOR TO REACHING A NEXT TRANSITION REGION (E.G., DURING A LOOK-AHEAD PREPARATION PERIOD), ESTIMATE A NEXT DOWNFORCE SETTING FOR THE IMPLEMENT (E.G., PLANTER OR PLANTER ROW UNIT) CONSISTENT WITH ALIGNMENT/OVERLAP OF THE DETERMINED POSITION, THE ESTIMATED ZONES, AND THE ESTABLISHED TRANSITION REGION.

S218
AT THE ENTRANCE POINT OR BEGINNING OF THE NEXT TRANSITION REGION, CONTROL AN ACTUATOR TO INCREASE OR INCREMENT THE NEXT DOWNFORCE SETTING FOR PRIMARY CORRESPONDING ZONES WITH A SURFACE ROUGHNESS INDEX RANGES THAT IS GREATER THAN A LOWER LIMIT OF A ZONE THRESHOLD, OR TO DECREASE OR DECREMENT THE DOWNFORCE SETTING FOR SECONDARY CORRESPONDING ZONES THAT IS LESS THAN AN UPPER LIMIT OF THE ZONE THRESHOLD TO TRANSITION BETWEEN DIFFERENT SURFACE DOWNFORCE SETTINGS.

FIG. 2E

METHOD AND SYSTEM FOR ESTIMATING SURFACE ROUGHNESS OF GROUND FOR AN OFF-ROAD VEHICLE TO CONTROL AN IMPLEMENT

RELATED APPLICATION

This document (including the drawings) claims priority and the benefit of the filing date based on U.S. provisional application No. 62/986,012, filed Mar. 6, 2020 under 35 U.S.C. § 119 (e), where the provisional application is hereby incorporated by reference herein.

FIELD

This disclosure relates to a method and system for estimating surface roughness of ground for an off-road vehicle to control an implement.

BACKGROUND

An off-road vehicle may be operated in fields or work sites where natural or artificial irregularities in the surface of the ground can impact the performance of the off-road vehicle, or its implement. For example, if a field has been subjected to earth-moving operations or deep tillage, surface irregularities, like ruts, may cause the vehicle's tires or tracks to deviate from the target path plan. Further, irregularities may contribute to operator fatigue or annoyance because of increased vibrations in the cab of the vehicle. In some cases, crop residue, surface soil, vegetation, or poor visibility (e.g., fog), can conceal surface irregularities to the operator or optical sensors of the vehicle.

In some background art, an automatic guidance system may be used to guide a vehicle, or its implement to track a path plan. However, certain ground or soil conditions can lead to variance of the off-road vehicle, or its implement, from tracking the target path plan, regardless of whether the automatic guidance system is fully operational. For example, in response to ground surface irregularities, the implement may experience unwanted variations in the otherwise uniform application of crop inputs, such as seeds, fertilizer, nutrients, fungicides, pesticides, herbicides, or other treatments. The application of crop inputs could vary from target settings, specifications or target tolerances, while possibly degrading implement performance sufficiently to reduce crop yield. Thus, there is a need a method and system for estimating surface roughness of a ground for an off-road vehicle to control an implement.

SUMMARY

In accordance with one embodiment, a method and system is configured to estimate surface roughness of ground for an off-road vehicle to control an implement. Motion data is detected for an off-road vehicle traversing a field or work site during a sampling interval. The motion data may comprise ground speed (e.g., ground velocity) of the off-road vehicle. A location-determining receiver provides a respective position of the vehicle, or its implement, for the sampling interval. A first sensor is adapted to detect pitch data of the off-road vehicle for the sampling interval (e.g., to obtain pitch acceleration). A second sensor is adapted to detect roll data of the off-road vehicle for the same sampling interval (e.g., to obtain roll acceleration). An electronic data processor or surface roughness index estimator module determines or estimates a surface roughness index for a cell or zone of the field or work area based on the detected motion data, pitch data and roll data for the sampling interval. The surface roughness index can be displayed by respective position (e.g., two or three dimensional coordinates) on the graphical display to a user or operator of the vehicle, or stored, regularly, in a data storage device to create a data map of surface roughness index versus respective positions (e.g., traversed by the vehicle) in the field or work site.

In accordance with another aspect of the disclosure, the electronic data processor or surface roughness index estimator module is configured to estimate zones (e.g., cells) with corresponding surface roughness index ranges within a field or work site based on the determined surface roughness index as a vehicle traverses or traversed the field or work site over multiple sampling intervals. Further, the electronic data processor or surface roughness index estimator module can generate a graphical display that illustrates the estimated zones of corresponding surface roughness or index ranges within the field or work site.

BRIEF DESCRIPTION OF THE DRAWINGS

FIG. 2E is a flow chart of a fifth embodiment of a method for estimating surface roughness of ground for an off-road vehicle to control an implement.

DETAILED DESCRIPTION

Figure 1A:
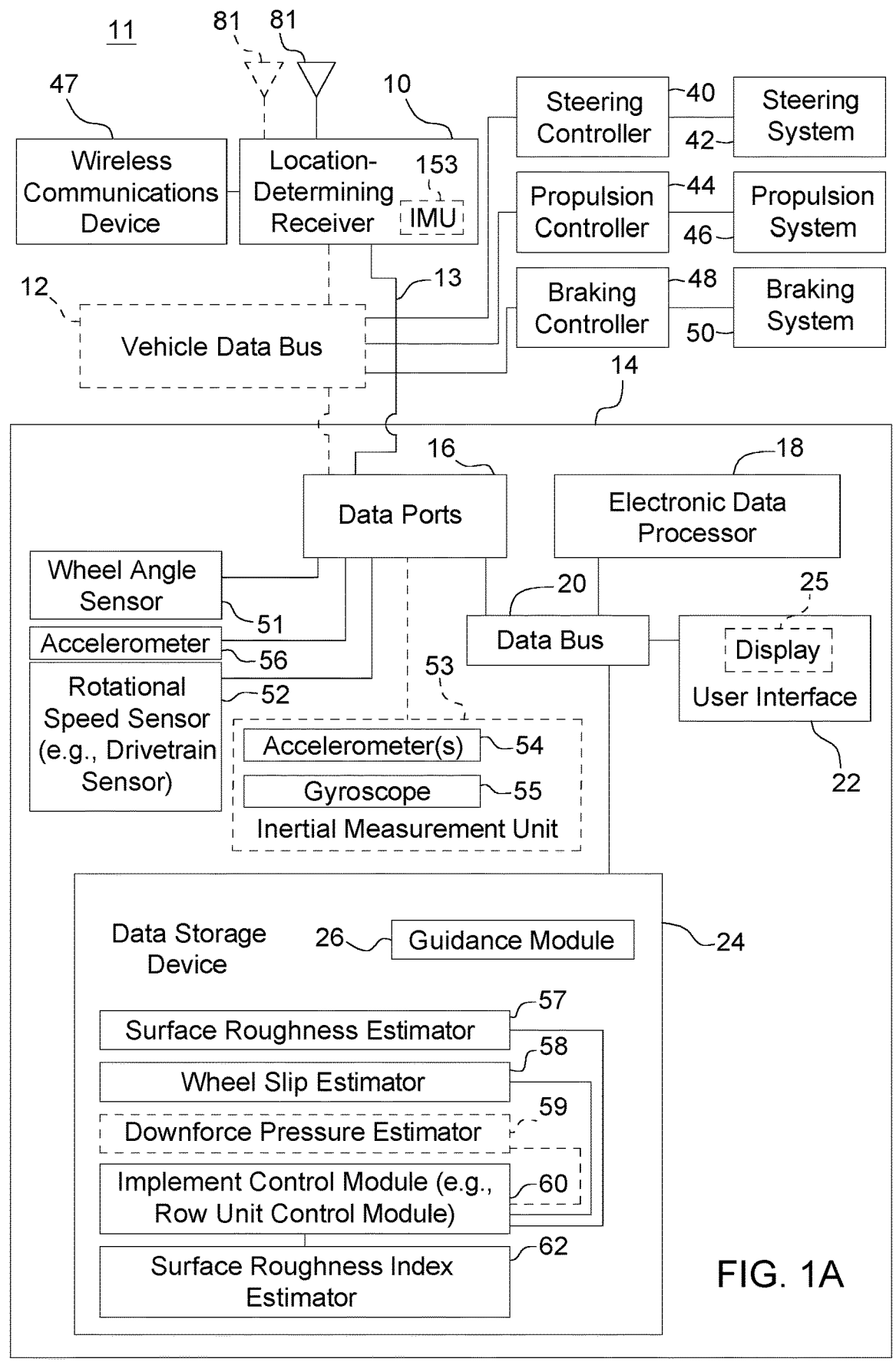
FIG. 1A is a block diagram of one embodiment of a system for estimating surface roughness of ground for an off-road vehicle to control an implement.
Figure 4:
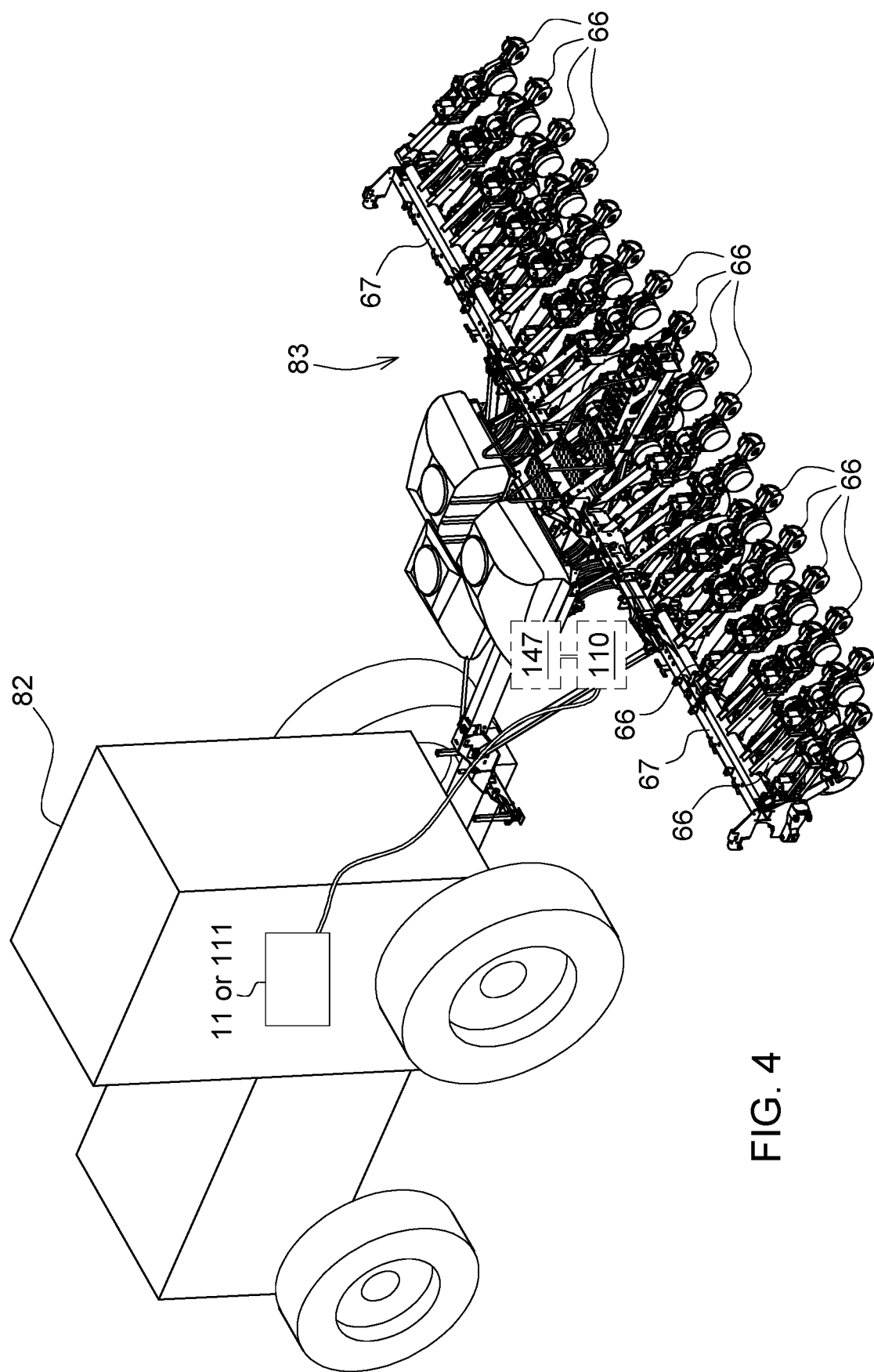
FIG. 4 is a perspective view of a off-road vehicle that is towing a planting implement of multiple row units with adjustable down-force in accordance with a map of surface roughness zones.

FIG. 1A is one embodiment of a block diagram of a system 11 for estimating surface roughness of ground (e.g., one or more zones or cells of the ground) for an off-road vehicle (e.g., 82 in FIG. 4) to control an implement (e.g., 83 in FIG. 4). In FIG. 1A, the system 11 is capable of detecting motion data and attitude data by one or more sensors, such as one or more location-determining receivers (10, 110), one or more accelerometers (54, 56), gyroscope 55, or an internal measurement unit (IMU) (53, 153) that use accelerometers or gyroscopes. In one example, the system 11 may send a surface roughness indicator (e.g., surface roughness index value) or data message to an operator or end user of the detection system 11 via a user interface 22 that is incorporated into a vehicle, such as a display 25. In an alternate embodiment, the user interface 22 and display 25 may be located remotely from the vehicle via a wireless link to support remote control or tele-operation of the vehicle by the operator.

In one embodiment, the system 11 comprises an electronic data processing system 14 that is coupled to a location-determining receiver 10 directly, or via a vehicle data bus 12. The optional connection via vehicle data bus 12 is shown in dashed lines because it is optional and the connection between the electronic data processing system 14 and location-determining receiver 10 may be direct, as indicated by transmission line 13, which can be used separately or cumulatively with the interconnection via the vehicle data bus 12. The location-determining receiver 10 may have an antenna 81 mounted on the vehicle, on the implement or both.

In an alternate embodiment, a first location-determining receiver 10 and its antenna 81 are on or in the vehicle (e.g., 82 in FIG. 4); a second location-determining receiver 110 (in FIG. 1B) and its antenna are on or in the implement (e.g., 83 in FIG. 4), where both the first location-determining receiver 10 and the second-location determining receiver 110 may comprise satellite navigation receivers (with or without differential correction data) or other location-determining receivers.

In one embodiment, the electronic data processing system 14 comprises an electronic data processor 18, one or more data ports 16, a user interface 22 and a data storage device 24 coupled to a data bus 20. The electronic data processor 18 may comprise a processor, a microcontroller, a digital signal processor, an application specific integrated circuit (ASIC), a programmable logic array, a programmable logic device, a logic circuit, an arithmetic logic unit, a Boolean logic device, or another data processing device. The data storage device 24 may comprise one or more of the following: electronic memory, nonvolatile electronic memory, an optical data storage device, a magnetic data storage device, or other device for storing digital or analog data.

In one embodiment, the data storage device 24 may store, retrieve, read and write one or more of the following items: a guidance module 26, a surface roughness estimator 57, a wheel slip estimator 58, a down-force pressure estimator 59, an implement control module (e.g., row unit control module) and a surface roughness index estimator 62. A module means software, electronics, or both, where software can include software instructions, executable files, data structures, and libraries, among other things.

As used in this document, configured to, adapted to and arranged to may refer any of the following items: (1) software or program instructions that are stored in the data storage device 24 or other data storage and executable by the data processor 18 to perform certain functions, software, (2) software or embedded firmware that are stored in the location-determining receiver (10, 110) or its memory or data storage to perform certain functions, or (3) electronic, electrical circuits or modules that can perform substantially equivalent functions to the software, embedded firmware or program instructions.

Any data port 16 may comprise a data transceiver, buffer memory, or both. The user interface 22 may comprise one or more of the following: a display 25 (e.g., display), a touch screen display, a keypad, a keyboard, a control panel, a pointing device (e.g., electronic mouse), or another device for entry or output of data from the data processing system 14.

In one embodiment, a wheel angle sensor 51, one or more accelerometers (54, 56), a rotational speed sensor 52, an optional IMU (53, 153) and a data bus 20 are coupled to the data ports 16. The electronic data processing system 14 communicates to data ports 16 directly, or indirectly via the data bus 20. Further, the data ports 16 support the communication of data messages to, from or between, or among any of the following: the electronic data processor 18, the data storage device 24, any modules, data, files, libraries, or software within the data storage device 24, the location-determining receiver (10, 110) the wheel angle sensor 51, one or more accelerometers (54, 56), a rotational speed sensor 52, an optional IMU and a data bus 20.

In one embodiment, the optional IMU 53 is a separate device, whereas in other embodiments, the IMU 153 is integral with the location-determining receiver 10. The optional separate IMU 53 comprises one or more accelerometers 54 and a gyroscope 55, where the accelerometers 54 may be arranged on orthogonal axes with respect to each other to facilitate detection of vehicle attitude, such as roll angle, pitch angle and yaw angle of a vehicle.

In FIG. 1A, the steering controller 40, the propulsion controller 44 and the braking controller 48 are coupled to the vehicle data bus 12. For example, the data processing system 14 can communicate with the steering controller 40, the propulsion controller 44 and the braking controller 48, and vice versa. In one embodiment, the steering controller 40 is coupled to the steering system 42, such as an electrical motor or electrohydraulic device that is mechanically coupled to a steering mechanism (e.g., rack-and-pinion or Ackerman steering system) for controlling the angular orientation of one or more wheels about a generally vertical axis. In one embodiment, the propulsion controller 44 may comprise an electronic engine controller for controlling a throttle or fuel metering system of a propulsion system 46, such as internal combustion engine. In another embodiment, a propulsion controller 44 may comprise an inverter or motor controller for controlling a propulsion system 46, such as a drive motor of a hybrid or electric vehicle. In one embodiment, the braking controller 48 interfaces with a braking system 50, such as hydraulic braking system, an electrohydraulic braking system, a cable braking system, or an electromechanical braking system to stop or decelerate the vehicle.

In one configuration, the guidance module 26 controls the vehicle to track or follow a path plan. Further, a path plan may comprise a generally linear path plan, a curved path plan, a contour path plan, a spiral path plan, a coverage area path plan, or other path plan, such as any of the path plans illustrated in FIG. 3A or FIG. 3B. For example, a path plan may comprise any of the following: one or more linear path segments or rows 302, curved path segments or turns 303, such as an end turn, a key-hole end turn, a loop end turn, a row-skipping end turn. In the automated guidance mode, in certain vehicle configurations the guidance module 26 can control the steering, propulsion, and braking of the vehicle. For example, in the automated guidance mode, the guidance module 26 can communicate with one or more of the following controllers to direct and guide the vehicle: steering controller 40, propulsion controller 44 and braking controller 48.

In FIG. 1A in accordance with one embodiment, the system 11 comprises one or more location-determining receivers 10 for estimating a position, motion, and attitude data of the vehicle (82 in FIG. 4), or its implement (e.g., 83 in FIG. 4), or both. As used in the disclosure, attitude refers to roll angle, pitch angle and yaw angle, or motion data associated with roll angle, pitch angle and yaw angle. As used in the disclosure, motion data comprises velocity data (e.g., speed data), acceleration data, or both. The velocity data and acceleration data may be expressed as vectors. As used in the disclosure, a yaw angle or heading can refer to: (1) an angular direction of travel of the vehicle with reference to due North or magnetic North, or (2) a yaw or yaw angle of the vehicle with reference to coordinate system, such as a Cartesian coordinate system.

In an alternate embodiment, a first location-determining receiver 10 or its antenna 81 is mounted on the vehicle for estimating a position, motion or attitude data of the vehicle (82 in FIG. 4) and a second location-determining receiver 110 is mounted on the implement (e.g., 83 in FIG. 4) for estimating a position, motion or attitude data of the implement that is coupled to the vehicle; position, motion and attitude data is available for the vehicle, its implement or both for processing by the electronic data processor 18 to execute the software instructions associated with modules, estimators, or other components within the data storage device 24.

In one embodiment, the location-determining receiver (10, 110) (e.g., satellite navigation receiver), alone or together with a wireless communications device, has a pair of antennas 81 that are spaced apart with a known orientation. Further, the location-determining receiver (10, 110) or the electronic data processor 18 can couple (e.g., selectively or switchably in rapid succession during the same epoch) either antenna 81 of the pair of antennas 81 to support estimation of the attitude of the pair of antennas when the vehicle or implement is at a fixed position or substantially the same position. For example, the pair of antennas 81 are spaced apart by a known distance on an axis with a known or fixed orientation (e.g., compound angular offset in one or more dimensions) to the longitudinal axis (in the direction of travel of the vehicle) and vertical axis of the vehicle. The location-determining receiver (10, 110) may estimate a first position (e.g., in three dimensions) of the first antenna 81 and a second position (e.g., in three dimensions) of the second antenna 81. Accordingly, the data processor or the location-determining receiver (10, 110) may estimate the precise attitude (e.g., yaw data, roll data, or both) of the vehicle, or its implement, based on the first position and the second position for the same epoch or measurement period, with or without augmentation by the correction data.

In one embodiment, a wireless communications device (47, 147) is coupled to a data port of a location-determining receiver (10, 110) or a vehicle data bus 12 to augment the received satellite signals and associated carrier phase measurements of the received satellite signals (e.g., of at least four satellites) at the location-determining receiver (10, 110). For example, the wireless communications device (47, 147) may comprise a separate receiver or transceiver (e.g., satellite, cellular, or wireless device) may receive the correction data or differential correction data via a wireless signal transmitted from a satellite or a terrestrial base station (e.g., real-time kinematic (RTK) base station). The wireless communications device (47, 147) may receive correction data from one or more of the following sources of correction data: (a) differential correction data from local base stations or local reference receivers operating in a real-time-kinematic (RTK) mode, (b) correction data associated with a precise-point-position (PPP) satellite navigation system with precise orbital correction data for satellites and satellite clocks in a PPP mode, (c) correction data applicable to a satellite navigation system, and correction data (e.g., carrier-phase offset or position vector offset) provided from a hub or central processing center in communication a network of reference satellite navigation receivers, and (d) other correction data is commercially available from local, wide-area, regional, or global correction or satellite data augmentation services.

In one embodiment, the location-determining receiver (10, 110) provides one or more of the following types of data for a vehicle, and/or its implement: yaw data (e.g., heading data), roll data, pitch data, position data, velocity data, and acceleration data (e.g., as vectors or in two or three dimensional coordinates). The location-determining receiver (10, 110) may comprise a satellite navigation receiver, a Global Navigation Satellite System (GNSS) receiver, a Global Positioning System (GPS) receiver, or another receiver for determining position data, motion data or attitude data. In one embodiment, a location-determining receiver (10, 110) provides location data, path heading data, vehicle heading data, velocity data, and acceleration data along target path or path plan to the data processing system 14 or guidance module 26.

In one embodiment, an optional separate inertial measurement unit 53 (IMU) may be separate from the location-determining receiver 10 or an optional integral IMU 153 may be integrated with the location determining receiver 10. The optional nature of the separate IMU 53 and the integral IMU 153 is indicated by dashed lines in FIG. 1A. The separate IMU 53 or the integral IMU 153 can estimate the attitude, yaw angle, yaw rate, roll, roll rate, pitch angle, pitch rate for the vehicle, or its implement, for instance. The yaw rate may refer to yaw angular velocity, yaw angular acceleration or both; the roll rate may refer to roll angular velocity, roll angular acceleration or both; the pitch rate may refer to pitch angular velocity, pitch angular acceleration or both.

In one configuration, the data processing system 14 comprises a roll sensor, pitch sensor and a yaw sensor. Any roll sensor, pitch sensor and yaw sensor may comprise an accelerometer (e.g., 54, 56), a three-axis accelerometer, a gyroscope, an IMU, or another sensor. In general, each sensor, such as roll sensor, that is based on accelerometer measurements and/or gyroscope measurements is subject to bias in their measurements that may arise over time, unless the sensor is calibrated or recalibrated (e.g., by the carrier phase measurements of the location-determining receiver (10, 110).)

In one embodiment, the roll sensor comprises a first accelerometer 56 that is configured to measure roll angle, roll angular velocity, and/or roll angular acceleration of the vehicle. Similarly, the pitch sensor comprises a second accelerometer 156 that is configured to measure pitch angle, pitch angular velocity and/or pitch angular acceleration of the vehicle. In one configuration, the roll sensor and the pitch sensor may provide attitude data and motion data, such as roll data and pitch data, that the electronic data processor 18 can use to determine a surface roughness estimate.

In another embodiment, the accelerometers (56, 156), gyroscopes 55 or IMU (53, 153) of the data processing system 14 detect or measure one or more of the following:

pitch angle, pitch motion data, roll angle and roll motion data to support the estimation of a surface roughness index for a cell or zone of the field or work area based on the detected motion data, pitch data and roll data for the sampling interval. To determine a reliable or accurate estimate of the surface roughness index, the electronic data processor 18 can estimate the sensor bias to perform calibration of roll sensor data, pitch sensor data, or both.

In one embodiment, a motion sensor is configured to detect motion data of an off-road vehicle traversing a field or work site during a sampling interval. The motion data comprises ground speed or velocity of the off-road vehicle, or its implement. A first sensor (e.g., accelerometer 56 or IMU (53, 153)) is configured to: (a) detect pitch data of the off-road vehicle, or its implement, for the sampling interval to obtain a pitch acceleration, or (b) detect pitch angular acceleration data for the sampling interval. A second sensor (e.g., accelerometer 156 or IMU (53, 153)) is configured to: (a) detect roll data of the off-road vehicle, or its implement, for the sampling interval to obtain a roll acceleration, or (b) detect roll angular acceleration data of the off-road vehicle, or its implement, for the sampling interval. If the first sensor only detects pitch angle with respect to time, the electronic data processor 18 is configured to derive the pitch angle acceleration from a derivative of the detected pitch angle with respect to time. Similarly, if the second sensor only detects roll angle with respect to time, an electronic data processor 18 is configured to derive the roll angle acceleration from a derivative of the detected roll angle with respect to time.

In an alternate embodiment, the surface roughness estimator 57 can operate in accordance with various techniques that may be applied alternately or cumulatively. Under a first technique, the surface roughness estimator 57 determines estimated surface roughness index based on a measure of roll angle rate variability. Under a second technique, the surface roughness estimator 57 determines estimated surface roughness value or surface roughness index based on a standard deviation of the rate of roll angle change with respect to time.

In one embodiment, a rotational speed sensor 52 is configured to measure a drivetrain-derived wheel speed. A wheel-slip estimator 58 estimates the wheel slip indicator based on drivetrain-derived wheel speed and the estimated velocity, which is provided by the location-determining receiver 10. A wheel-slip estimator 58 estimates the wheel slip indicator based on numerator of drivetrain-derived wheel speed (e.g., sensor wheel speed) minus estimated velocity, which numerator is collectively divided by the drivetrain-derived wheel speed.

In FIG. 1A, a surface roughness estimator 57 is configured to estimate zones with corresponding surface roughness index ranges within a field or work site based on the determined surface roughness index as a vehicle (e.g., 82 in FIG. 4) traverses or traversed the field or work site over multiple sampling intervals. An electronic data processor 18 is configured to generate a graphical display 25 that illustrates the estimated zones of corresponding surface roughness or index ranges within the field or work site. Further, an end user interface 22 is adapted to display 25 the graphical display 25 to a user or operator of the vehicle. In some configurations, the graphical display that illustrates estimates zones of corresponding surface roughness index ranges may resemble FIG. 3A or FIG. 3B, although graphical representations fall within the scope of the disclosure and appended claims.

A location-determining receiver (10, 110) can determine a position of a vehicle (82), or its implement (83), in the field or in the work site with respect to the estimated zones of different corresponding surface roughness index ranges.

In one embodiment, the down-force pressure estimator 59 can be operated in accordance with various technique, which may be applied separately or cumulatively. Under a first technique, a down-force pressure estimator 59 is configured to estimate a down-force setting (e.g., target down-force setting) for the implement consistent with alignment and/or overlap of the determined position (e.g., in two or three dimensional coordinates) of the implement (or vehicle) and the estimated zones. Under a second technique, a down-force pressure estimator 59 configured to estimate a down-force settings (e.g., target down-force settings) associated with the corresponding row units 66 of the implement 83 consistent with alignment and/or overlap of the determined position of the implement and the estimated zones, where different row units 66 can have different down-force settings if the different row units 66 of the implement fall within different estimated zones of the corresponding surface roughness ranges.

Figure 5:
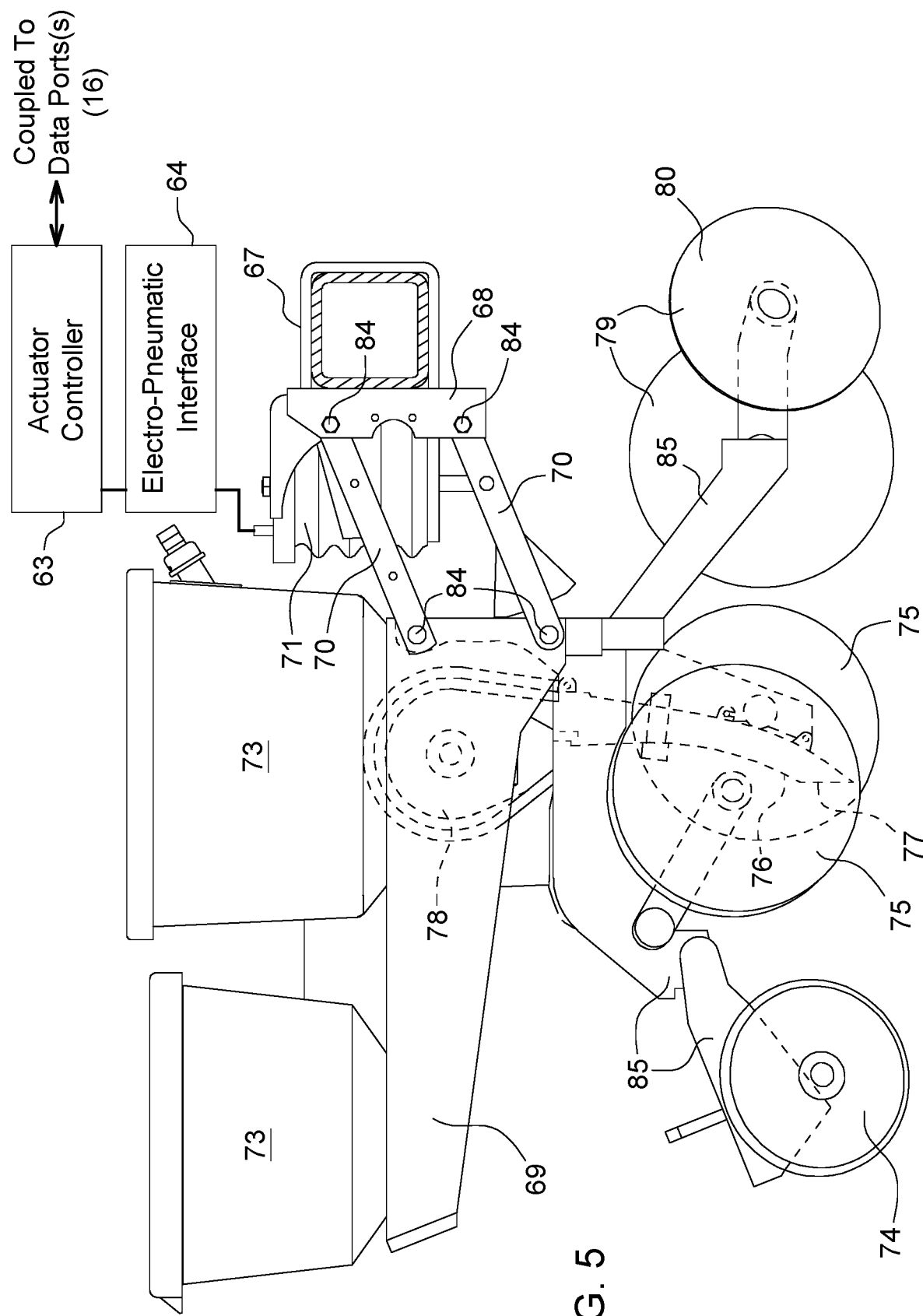
FIG. 5 is a side view of one embodiment of a row unit, with adjustable down-force, of the planting implement of FIG. 4.
Figure 6:
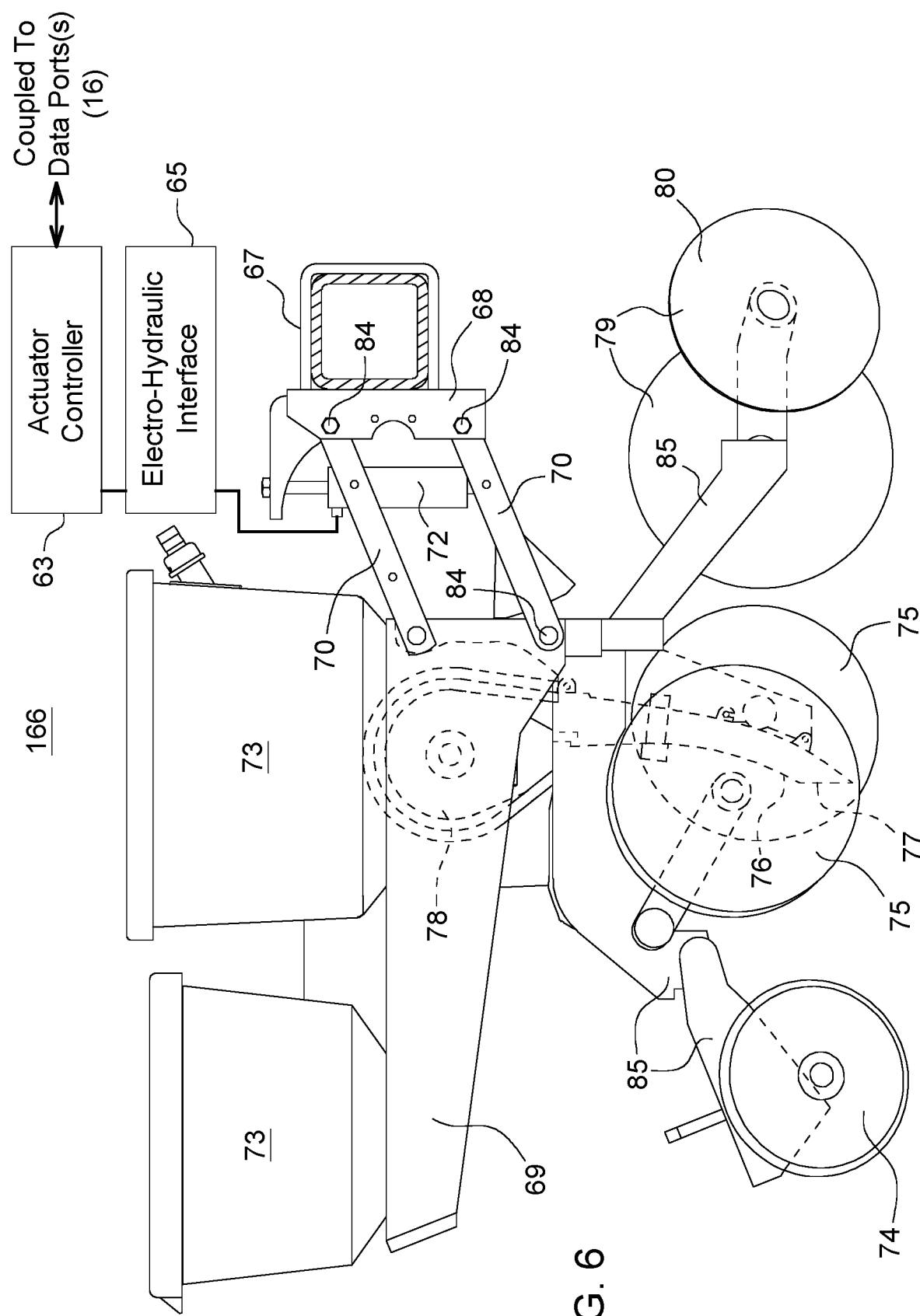
FIG. 6 is a side view of another embodiment of a row unit, with adjustable down-force, of the planting implement of FIG. 4.

As illustrated in FIG. 1A in conjunction with FIG. 5 or FIG. 6, the implement control module 60 or actuator controller 63 can be operated in accordance with various procedures that may be applied separately or cumulatively. Under a first procedure, an implement control module 60, the actuator controller 63, or both are configured to control an actuator (71, 72) (e.g., via an interface (64, 65)) to adjust the estimated down-force setting for corresponding zones with a surface roughness index ranges for transitions or changes between different zone limits or zone thresholds. Under a second procedure, an implement control module 60, actuator controller 63, or both are configured to control an actuator (71, 72) (e.g., via an interface 64, 65) to increase or increment the down-force setting for a primary corresponding zones with surface roughness index range that is greater than a lower limit of a zone threshold, or to decrease or decrement the down-force setting for a secondary corresponding zones that is are less than an upper limit of the zone threshold to transition between different down-force settings.

Figure 1B:
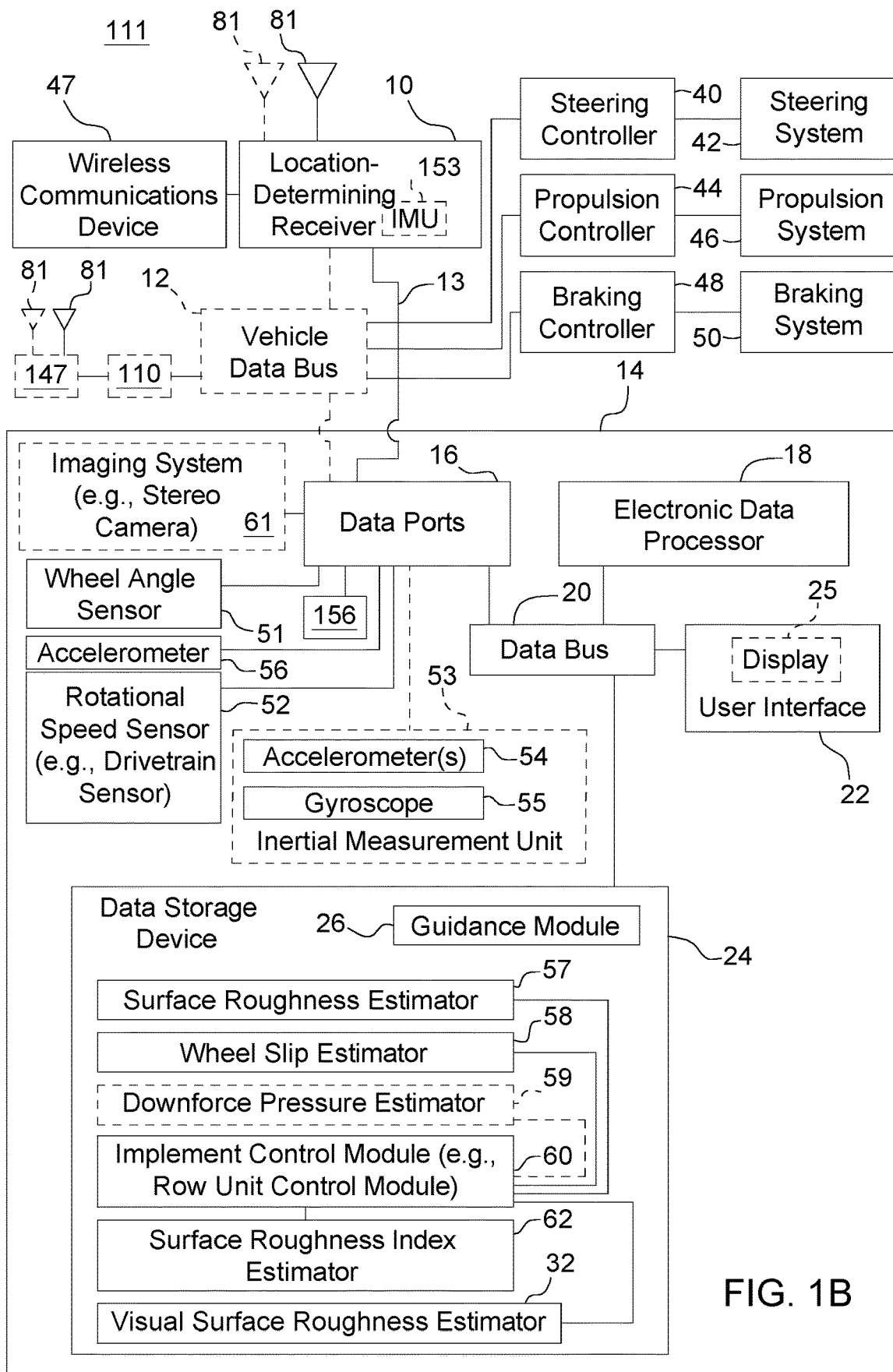
FIG. 1B is a block diagram of another embodiment of a system for estimating surface roughness of ground for an off-road vehicle to control an implement.

The system 111 of FIG. 1B is similar to the system 11 of FIG. 1A, except the system 111 further comprises an imaging system 61, a visual surface roughness index estimator 32, a second location determining receiver 110, a wireless communications device 147, and a second accelerometer 156. As illustrated the imaging system 61 is coupled to one or more data ports 16 of the data processing system 14; the visual surface roughness index estimator 32 comprises a module or software instructions that are stored in the data storage device 24 for execution by the electronic data processor 18. Like reference numbers in FIG. 1A and FIG. 1B indicate like features or elements.

In one embodiment, the imaging system 61 is configured to collect image data of the field or work site in a forward field of view of the vehicle in one or more electromagnetic frequency bands or wavelengths, such as humanly visible light, infra-red radiation, ultra-violet radiation, or the like. For example, the imaging system 61 may comprise a stereo imaging system or stereo camera for collecting stereoscopic images or three-dimensional image clouds or three-dimensional image constellations of ground regions within the field of view (e.g., forward facing region or zone in front of the vehicle 82). In some configurations, the imaging system 61 or electronic data processor 18 can align (e.g., or stitch together) successive local images to assemble an aggregate view of an entire field or work area that is traversed or surveyed by the off-road vehicle equipped with the imaging system 61. For example, the imaging system 61 or electronic data processor 18 may assign or identify two or three dimensional reference points in successive local images to spatially align successive images to assemble an aggregate view of an entire field or work area.

Based on the collected three-dimensional image clouds or three-dimensional image constellations, a visual surface roughness index estimator 32 configured to estimate a visual surface roughness index for the collected image data within the field of view to establish a transition between different estimated down-force setting zones. For example, the visual surface roughness estimator 32 may estimate or model the three-dimensional slope or compound slopes of zones or cells within the field of the work area, such as average, mean, mode or median cellular pitch angle, cellular roll angle and cellular yaw angle for each cell within a work area or field. In one configuration, the visual surface roughness index may be based on a visual estimation of the surface roughness index (p), determined in accordance with Equation 1.

In conjunction with the visual surface roughness index or transition regions 311 (in FIG. 3B) derived from the visual surface roughness index, the down-force pressure estimator 59 can be operated in accordance with various examples, which may be applied separately or cumulatively. Under a first example, prior to reaching a next transition region 311, a down-force pressure estimator 59 is configured to estimate a next down-force setting for the implement (or one or more row units 66) consistent with alignment and/or overlap of the determined position, the estimated zones and the established transition region. Under a second example, at the entrance point or beginning of the next transition region 311, controlling an actuator (71, 72) to increase or increment the next down-force setting for one or more primary corresponding zones with a surface roughness index range that is greater than a limit of a previous zone threshold that the vehicle, or its implement, is exiting. Under a third example, at the entrance point or beginning of the next transition region 311, controlling an actuator (71, 72) to decrease or decrement the down-force setting for one or more secondary corresponding zones with a surface roughness index range that is less than a limit of the previous zone threshold to transition between the different surface down-force settings that the vehicle, or its implement (e.g., one or more row units 66), is exiting.

The second location-determining receiver 110 is the same or similar to the location-determining receiver 10, which may be referred to as the first location determining receiver. However, the first location-determining receiver may be mounted on or in the vehicle 82, or its implement 83. If both a first location-determining receiver 10 and second location-determining receiver 110 are present, the second location-determining receiver is typically mounted on or in the implement 83 and the first location-determining receiver is mounted on or in the vehicle 82. The wireless communications device 147 is the same or similar to the wireless communications device 47. For example, the wireless communications device 147 is coupled to the second location-determining receiver 110 to provide correction data to it.

Figure 2A:
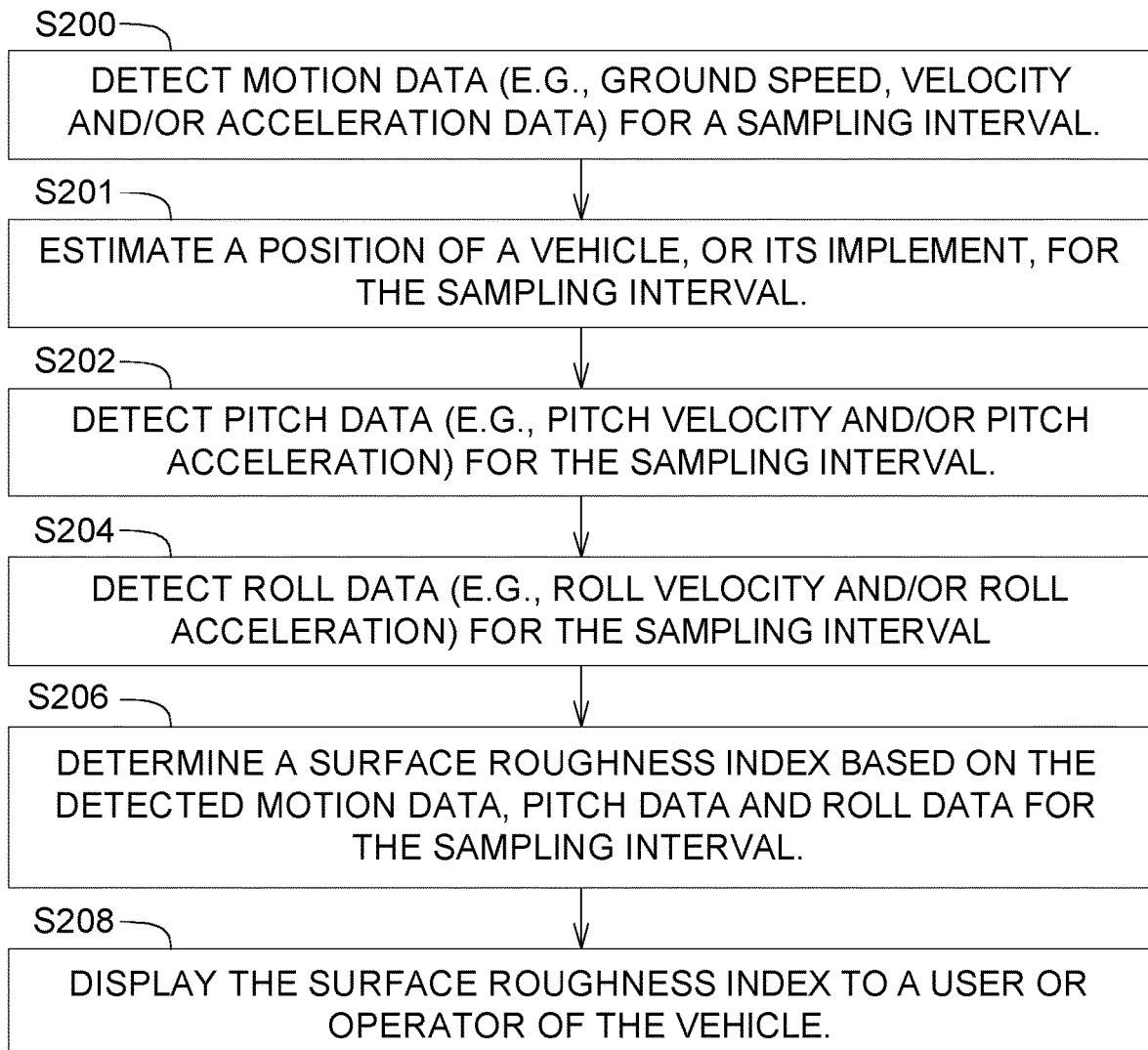
FIG. 2A is a flow chart of a first embodiment of a method for estimating surface roughness of ground for an off-road vehicle to control an implement.

FIG. 2A is a flow chart of a first embodiment of a method for estimating surface roughness of a ground for an off-road vehicle to control an implement. The method of FIG. 2 begins in step S200.

Figure 3A:
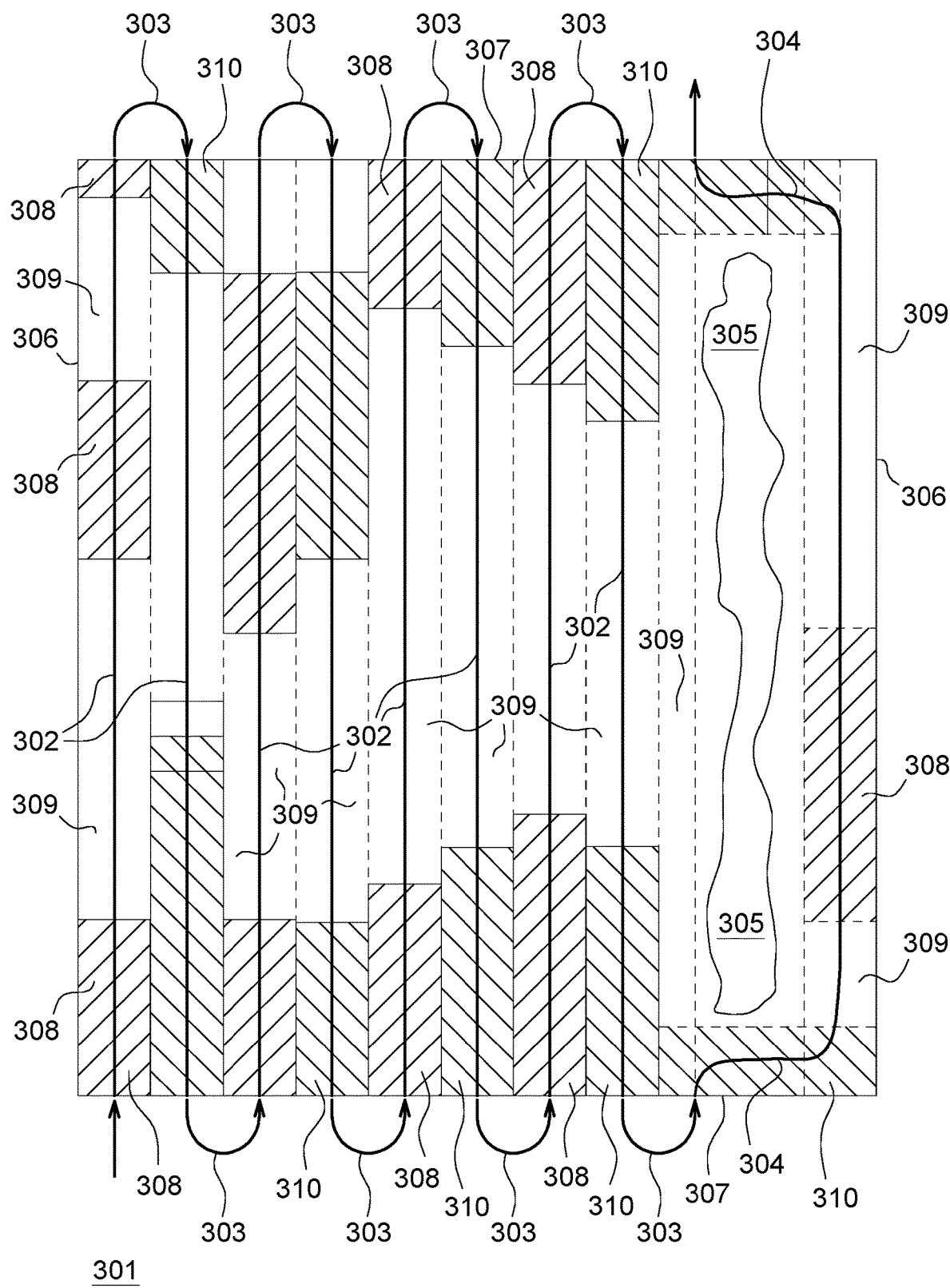
FIG. 3A is a plan view of a first illustrative map of surface roughness zones within a hypothetical field.
Figure 3B:
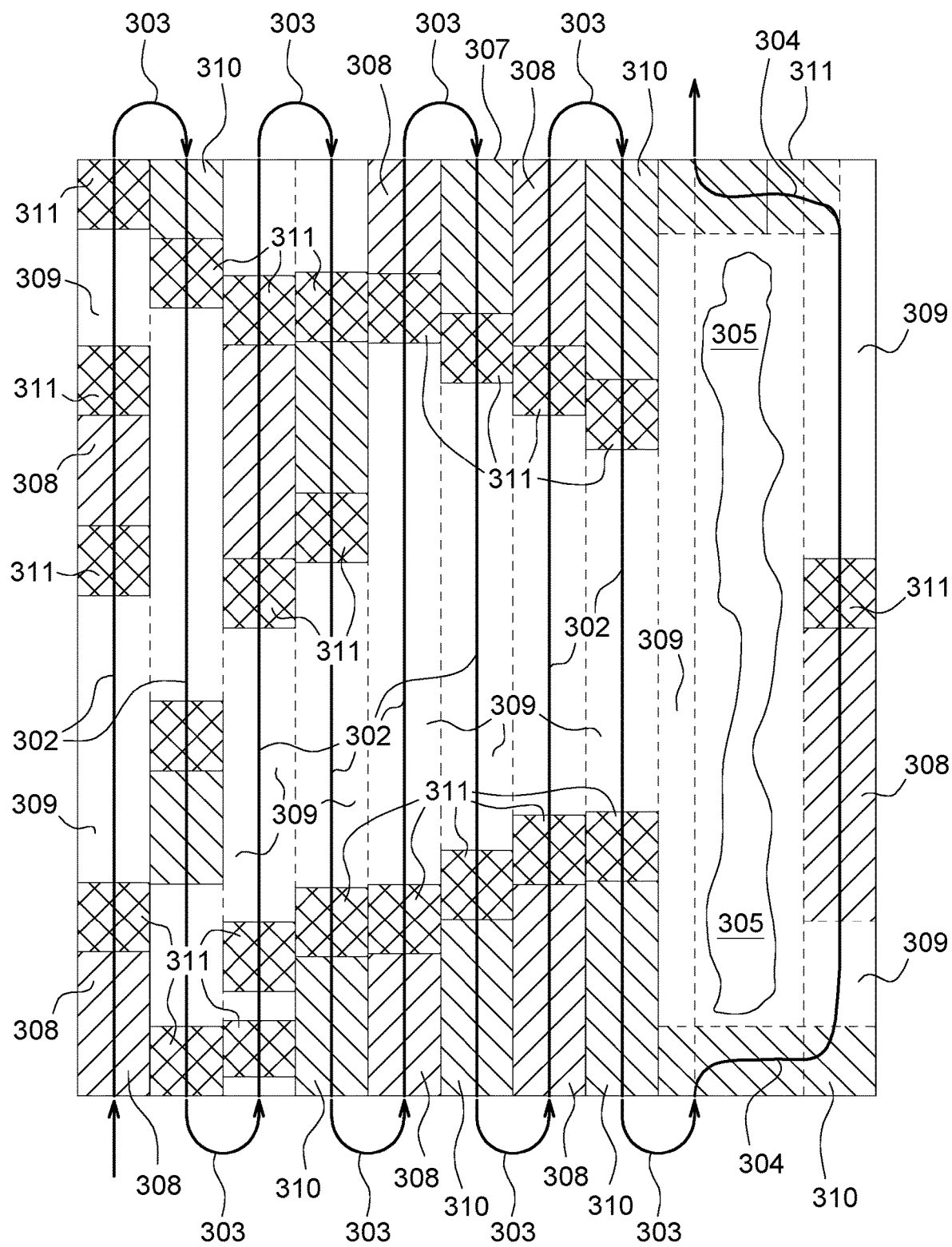
FIG. 3B is a plan view of a second illustrative map of surface roughness zones within a hypothetical field.

In step S200, a motion sensor, such as a location-determining receiver 10, detects motion data of an off-road vehicle (e.g., 82 in FIG. 4) traversing a field or work site (e.g., as illustrated in FIG. 3A or FIG. 3B, or otherwise) during a sampling interval or multiple sampling intervals. For example, the motion data comprises at least ground speed of the off-road vehicle.

In an alternate embodiment, the motion data may comprise any of the following measured or observed at the vehicle, the implement or both: ground speed, velocity, acceleration data for one or more sampling intervals In one embodiment, the motion sensor may comprise an odometer, a speedometer, a dead-reckoning sensor, an accelerometer (54, 56), a three-axis accelerometer assembly, a gyroscope 55, an inertial measurement unit (IMU) (53, 153), a radar system, a LIDAR system (e.g., light/laser detection and ranging), a satellite navigation receiver, a location-determining receiver (10, 110), a satellite navigation receiver with a wireless device for receiving correction data (e.g., differential correction data). A radar system may comprise a transmitter that transmits an encoded signal (e.g., pulse, pseudo-random noise code, or continuous waveform) toward an object and a receiver (e.g., doppler receiver) that receives a reflection of the coded signal from the object to determine a range, bearing, and/or velocity of an object. A location-determining receiver (10, 110) refers to a satellite navigation receiver with or without differential correction, along with a wireless communications device (47, 147) that can provide position, location, motion or attitude data from one or more terrestrial transmitter beacons on land or satellite transmitters in orbit about the Earth.

In step S201, a location-determining receiver (10, 110) (e.g., satellite navigation receiver) estimates or provides a respective position of the vehicle (e.g., 82), its implement (e.g., 83), for the sampling interval.

In step S202, a first sensor detects pitch data of the off-road vehicle for the sampling interval to obtain a pitch acceleration. The first sensor may comprise an accelerometer 56 or IMU (53, 153) that is configured to measure the pitch angle or attitude of the vehicle, its implement. The first sensor may be mounted on the vehicle to measure the pitch angle or attitude of the vehicle, whereas the first sensor may be mounted on the implement or each row unit 66 to measure the pitch angle or attitude of the implement or row unit 66 of the implement.

Further, the first sensor may be coupled to an analog-to-digital (A/D) converter that converts analog pitch angle to digital signal. After the analog-to-digital converter digitizes the signal, the data processing system 14 may apply the electronic data processor 18 (and clock) to determine or derive the pitch angle velocity or pitch angle acceleration from the digital pitch angle. For example, the electronic data processor 18 may take the second derivative of the pitch angle with respect to time to determine the estimated pitch angle acceleration for one or more sampling intervals.

In step S204, a second sensor detects roll data of the off-road vehicle for the sampling interval to obtain a roll acceleration. The second sensor may comprise an accelerometer (156 or IMU (53, 153)) that is configured to measure the roll angle or attitude of the vehicle (e.g., 82), its implement (e.g., 83, or one or more row units 66). The second sensor (e.g., 156) may be mounted on the vehicle, to measure the roll angle or attitude of the vehicle, whereas the second sensor (e.g., 156) may be mounted on the implement or each row unit 66 to measure the roll angle or attitude of the implement or row unit 66 of the implement.

Further, the second sensor may be coupled to a analog-to-digital (A/D) converter that converts analog roll angle to digital signal. After the analog-to-digital converter digitizes the signal, the data processing system 14 may apply the electronic data processor 18 (and clock) to determine or the roll angle velocity or roll angle acceleration from the digital roll angle. For example, the electronic data processor 18 may take the second derivative of the roll angle with respect to time to determine the estimated roll angle acceleration for one or more sampling intervals.

In step S206, an electronic data processor 18, the surface roughness estimator 57, or the surface roughness index estimator module 62 determines or estimates a surface roughness index for a cell or zone of the field or work area based on the detected motion data, pitch data and roll data for the sampling interval.

The surface roughness index ($\rho$) for a corresponding point, path segment (e.g., linear path segment), zone, cell, region, strip, portion or area of the field or work site may be determined in accordance with the following equation ("Equation 1"):

$$\rho = \frac{\text{RMS}(A_{Pitch}) + \text{RMS}(A_{Roll})}{S},$$

where RMS($A_{pitch}$) is equal to root-mean-squared, angular pitch acceleration in meters per second squared (m/s$^2$); RMS ($A_{Roll}$) is equal to root-mean-squared, angular roll acceleration in meters per second squared (m/s$^2$), and S refers to speed in meters per second (m/s) of the vehicle or the implement in conjunction with a corresponding point, path segment (e.g., linear path segment), zone, cell, region, strip, portion or area of the field or work site in which samples (e.g., pitch or roll measurements) or observations were made.

RMS(APitch) can be determined by firstly squaring each observed angular pitch acceleration in a set of (raw) samples (e.g., collected during a sampling interval, such as for N raw samples: $A_{Pitch1}^2 + A_{Pitch2}^2 + \ldots A_{PitchN}^2$), by secondly determining a mean of the set of squared samples (e.g., divided by the total number N of samples), and by thirdly taking a square root of the determined mean in accordance with the following equation ("Equation 2"):

$$\text{RMS}(APitch) = \sqrt{(A_{Pitch1}^2 + A_{Pitch2}^2 + A_{PitchN}^2)/N},$$

where $A_{Pitch1}^2$ is the square of the first sample of observed angular pitch acceleration (in meters per second squared); $A_{Pitch2}^2$ is the square of the second sample of observed angular pitch acceleration (in meters per second squared); and $A_{PitchN}^2$ is the square of the Nth sample or last sample among N total samples.

RMS(ARoll) is equal to root-mean-squared, angular roll acceleration, can be determined by firstly squaring each observed angular roll acceleration in a set of (raw) samples (e.g., collected during a sampling interval, such as for N raw samples: $A_{Roll1}^2 + A_{Roll2}^2 + \ldots A_{RollN}^2$), by secondly determining a mean of the set of squared samples (e.g., divided by the total number N of samples), and by thirdly taking a square root of the determined mean in accordance with the following equation ("Equation 3"):

$$\text{RMS}(ARoll) = \sqrt{(A_{Roll1}^2 + A_{Roll2}^2 + A_{RollN}^2)/N},$$

where $A_{Roll1}^2$ is the square of the first sample of observed angular roll acceleration (in meters per second squared); $A_{Roll2}^2$ is the square of the second sample (in meters per second squared), and $A_{RollN}^2$ is the Nth sample or last sample among N total samples.

In step S208, the display 25 or user interface 22 displays or provides a representation of the surface roughness index by respective position (e.g., two or three dimensional coordinates) to a user or operator of the vehicle. Further, the electronic data processor 18 may collect and store regularly the surface roughness index by respective position in a data storage device 24 to create a data map 301 (e.g., in FIG. 3A and FIG. 3B) of surface roughness index versus respective positions. For manned vehicles, the graphical display 25 can be presented on a display 25 within the vehicle or, for unmanned vehicles, remotely from the vehicle via a wireless link.

In one configuration, the user interface 22 or display 25 may display a numerical indication, ranking or other visual indicator of one or more ranges of surface roughness index. For example, in accordance with the above equation, the surface roughness index may be scaled or normalized to have a value of surface roughness index: (a) between 0 to 10, where 10 indicates a maximum surface roughness index and 0 indicates the minimum surface roughness index; or (b) between 0 to 10, where 10 indicates a maximum surface roughness index and 0 indicates the minimum surface roughness index.

The surface roughness index may be organized or classified in accordance with various examples, which may be applied separately or cumulatively. Under a first example, the above Equation 1 may provide a surface roughness index ($\rho$) that may be divided into two ranges, such as a first range and a second range. Under a second example, the above Equation 1 may provide a surface roughness index ($\rho$) that may be divided into the following two ranges: (1) normal and elevated; (2) smooth and rough; (3) acceptable and unacceptable. Under a third example, the typical range of surface roughness index ($\rho$) may range between two ranges that are determined by the mode or median value of estimated surface roughness in accordance with the above Equation 1. In a fourth example, the typical range of surface roughness index ($\rho$) may range between two ranges that are determined as follows: (a) smooth, conditioned for planting, which is defined as surface roughness index from approximately 1 to 15; (b) rough, primary tillage (ripped ground), which is defined a surface roughness index ($\rho$) from approximately 16-35, where approximately means a tolerance of plus or minus ten percent.

Figure 2B:
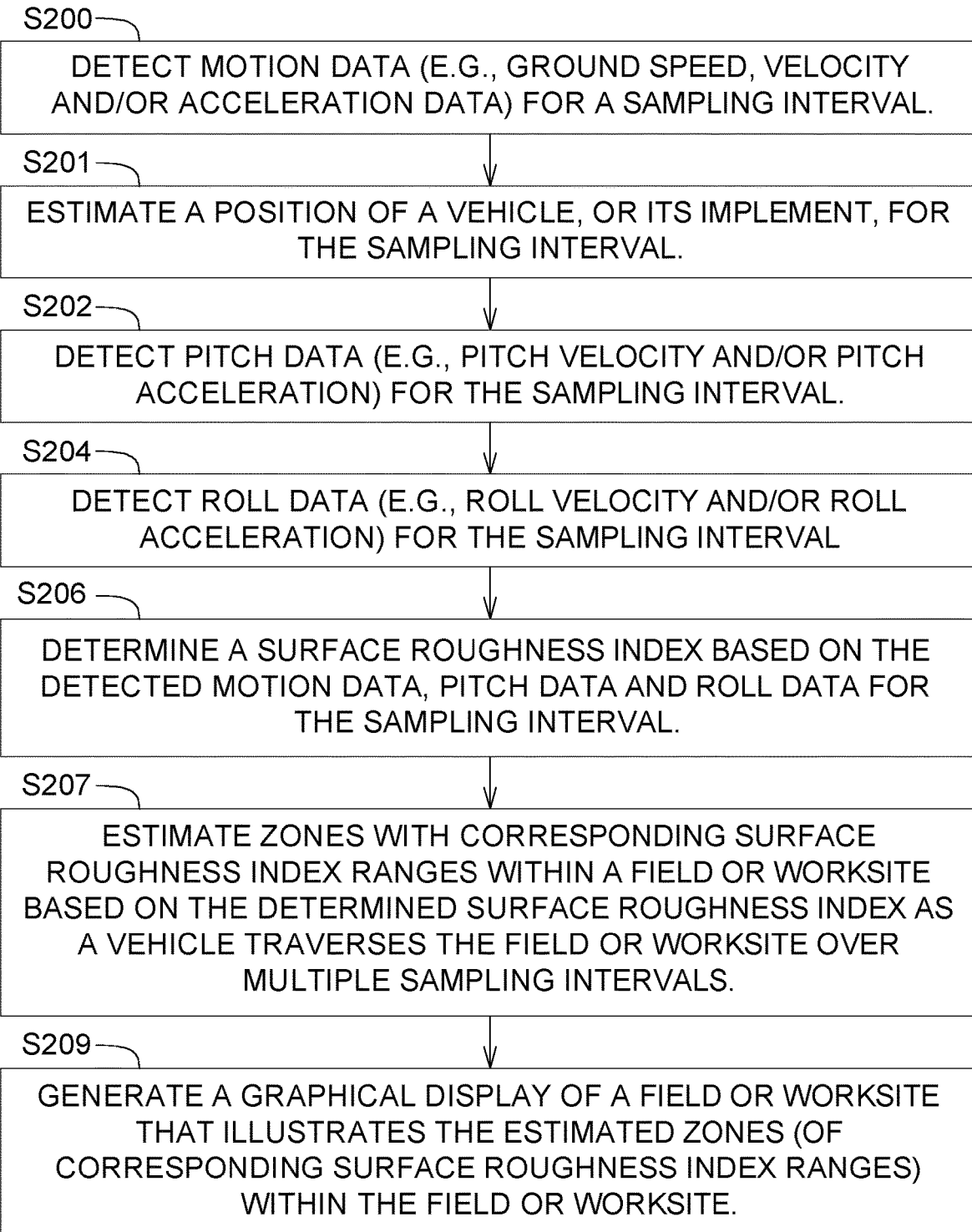
FIG. 2B is a flow chart of a second embodiment of a method for estimating surface roughness of ground for an off-road vehicle to control an implement.

FIG. 2B is a flow chart of a second embodiment of a method for estimating surface roughness of a ground for an off-road vehicle to control an implement. Like reference numbers in FIG. 2A and FIG. 2B indicate like steps or procedures.

In step S207, the electronic data processor 18, the surface roughness estimator 57, or surface roughness index estimator 62 is configured to estimate zones (e.g., cells) with corresponding surface roughness index ranges within a field or work site based on the determined surface roughness index versus positions (e.g., two or three dimensional coordinates) as a vehicle (e.g., 82) traverses or traversed the field or work site over multiple sampling intervals. For example, the electronic data processor 18, the surface roughness estimator 57, or surface roughness index estimator 62 collects a series of positions versus determined surface roughness index and classifies, ranks, clusters, groups or processes like surface roughness index within corresponding sets of non-overlapping ranges to create respective zones (e.g., to form a data map 301 in FIG. 3A and FIG. 3B). In one configuration as illustrated in hypothetical example of FIG. 3A, the non-overlapping ranges may comprise one or more of the following: a first zone 308 associated with a first range of surface roughness index values bounded by a first lower limit and a first upper limit of surface roughness index; a second zone 309 associated with a second range of surface roughness index values bounded by a second lower limit and a second upper limit of surface roughness index, and a third zone 310 associated with a third range of surface roughness index values bounded by a third lower limit and a third upper limit of surface roughness index.

The method of FIG. 2B may be deployed iteratively as survey of a corresponding field or work site each year or growing season, or as frequently as required to update surface roughness index information as recommended by civil engineering consultants, agronomists, soil experts or others. FIG. 3A provides one illustrative example of data maps 301 of zones of the corresponding surface index values that can be stored and retrieved on a field or work site for growing season or from the last growing season for application to a next growing season.

The data maps 301 or underlying data for surface index values versus zones may be stored on a data storage device 24 of the data processing system 14 or uploaded to a central server or a cloud computing service for retrieval by a different data processing system 14 on another subsequent vehicle or subsequent implement for performing a subsequent agronomic task in a growing season.

In step S209, the electronic data processor 18, surface roughness index estimator 62, or surface roughness estimator 57 can generate a graphical display 25 that illustrates the estimated zones of corresponding surface roughness or index ranges within the field or work site.

Figure 2C:
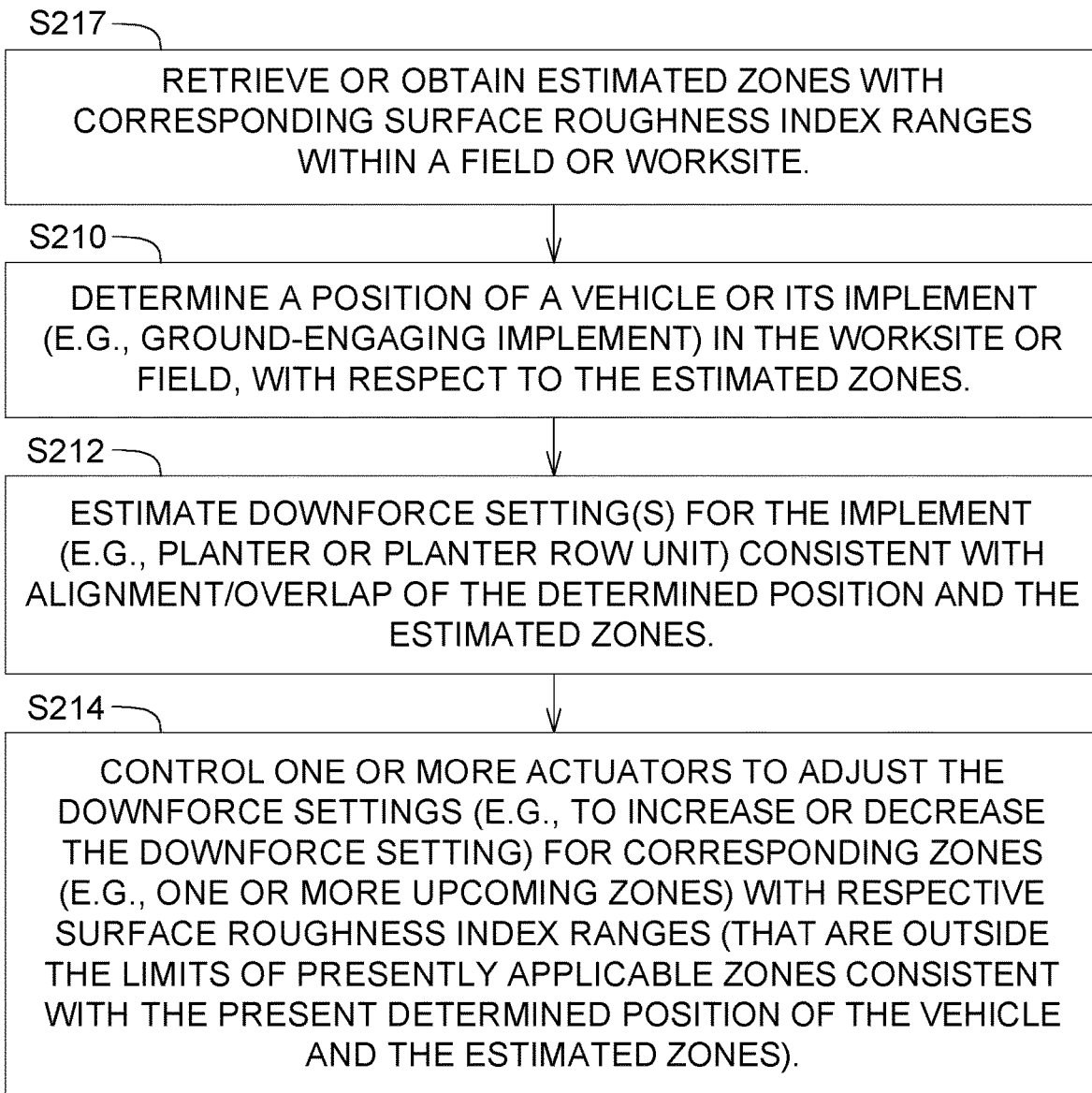
FIG. 2C is a flow chart of a third embodiment of a method for estimating surface roughness of ground for an off-road vehicle to control an implement.

FIG. 2C is a flow chart of a third embodiment of a method for estimating surface roughness of a ground for an off-road vehicle to control an implement.

In step S217, the electronic data processor 18 retrieves or obtain zones with corresponding surface roughness index ranges with a field or work site. For example, the electronic data processor 18 retrieves or obtains stored zones (e.g., in a data storage device 24) with corresponding surface roughness index ranges with a field or work site. Further, the stored zones with corresponding surface roughness index ranges may arise from previous step S207 of FIG. 2B, based on determined surface roughness index for a vehicle that traversed the field or work site.

In the method of FIG. 2A or FIG. 2B in preparation for step S207 of FIG. 2C, the data maps 301 or underlying data for surface index values versus zones may be stored on a data storage device 24 of the data processing system 14 or uploaded to a central server or a cloud computing service (e.g., with data storage devices) for retrieval by a different data processing system 14 on another subsequent vehicle or subsequent implement for performing a subsequent agronomic task in a growing season. For instance, an earlier vehicle (e.g., survey vehicle or reconnaissance vehicle, such as vehicle 82 without implement 83) may provide a survey service for collecting that data maps 301 of surface roughness index zones (e.g., incidental to the method of FIG. 2B), while a subsequent vehicle and/or implement (e.g., a combination of vehicle 82 with implement 83) may perform a tillage or planting operation (e.g., in FIG. 2C), or spraying operation (e.g., sprayer implement, or boom with nozzles required); where the earlier vehicle electronics and subsequent vehicle electronics (e.g., systems 11, 111 or data processing systems (e.g., 14)) can exchange or share data (e.g., for retrieval in step S217 of FIG. 2C) via the data storage device 24, the central service or cloud, with appropriate consent for processing, exchanging or sharing the data.

In an alternate embodiment, step S217 of FIG. 2C may be replaced by step S207 of FIG. 2B.

In step S210, the location determining receiver (10, 110) determines or estimates a position (e.g., in two or three dimensional coordinates) of the vehicle, or its implement in the work site or field with respect to the estimated zones (e.g., 308, 309, 310 in FIG. 3A) of different corresponding surface roughness index ranges.

In step S212, an electronic data processor 18, a down-force pressure estimator 59 (e.g., setting module estimates), or implement control module 60 generates or sends a down-force setting for the implement (e.g., 83 or one or more row units 66 of planter) consistent with alignment and/or overlap of the determined position of the implement and the estimated zones (e.g., 308, 309, 310 in FIG. 3A). In one embodiment, the electronic data processor 18, a down-force pressure estimator 59 (e.g., setting module estimates), or implement control module 60 may estimate down-force setting (and dynamically adjust in real time) for one or more row units 66 of the implement consistent with alignment and/or overlap of the determined position of the implement and the estimated zones, where different row units 66 may have different down-force settings if different row units 66 fall within different estimated zones of the corresponding surface index roughness ranges. For instance, the estimated zones may be estimated to be narrower than the vehicle swath or implement swath, which is somewhat different than the simplified version of FIG. 3A and FIG. 3B, in which for simplicity and clarity the estimated zones are limited to generally rectangular regions of the entire vehicle swath or implement swath merely for illustrative purposes.

In step S214, the electronic data processor 18, implement control module 60, or the actuator controller 63 controls an actuator (71, 72) (e.g., directly, or indirectly via an interface 64, 65) to adjust the down-force setting for corresponding zones with a surface roughness index ranges for transitions or changes between different zone limits or zone thresholds. For example, the electronic data processor 18, implement control module 60, or the actuator controller 63 controls an actuator (71, 72) (e.g., directly, or indirectly via an interface 64, 65) controls an actuator (71, 72) to increase or increment the down-force setting for corresponding zones with a surface roughness index ranges that exceed a lower limit of the zone threshold.

Figure 2D:
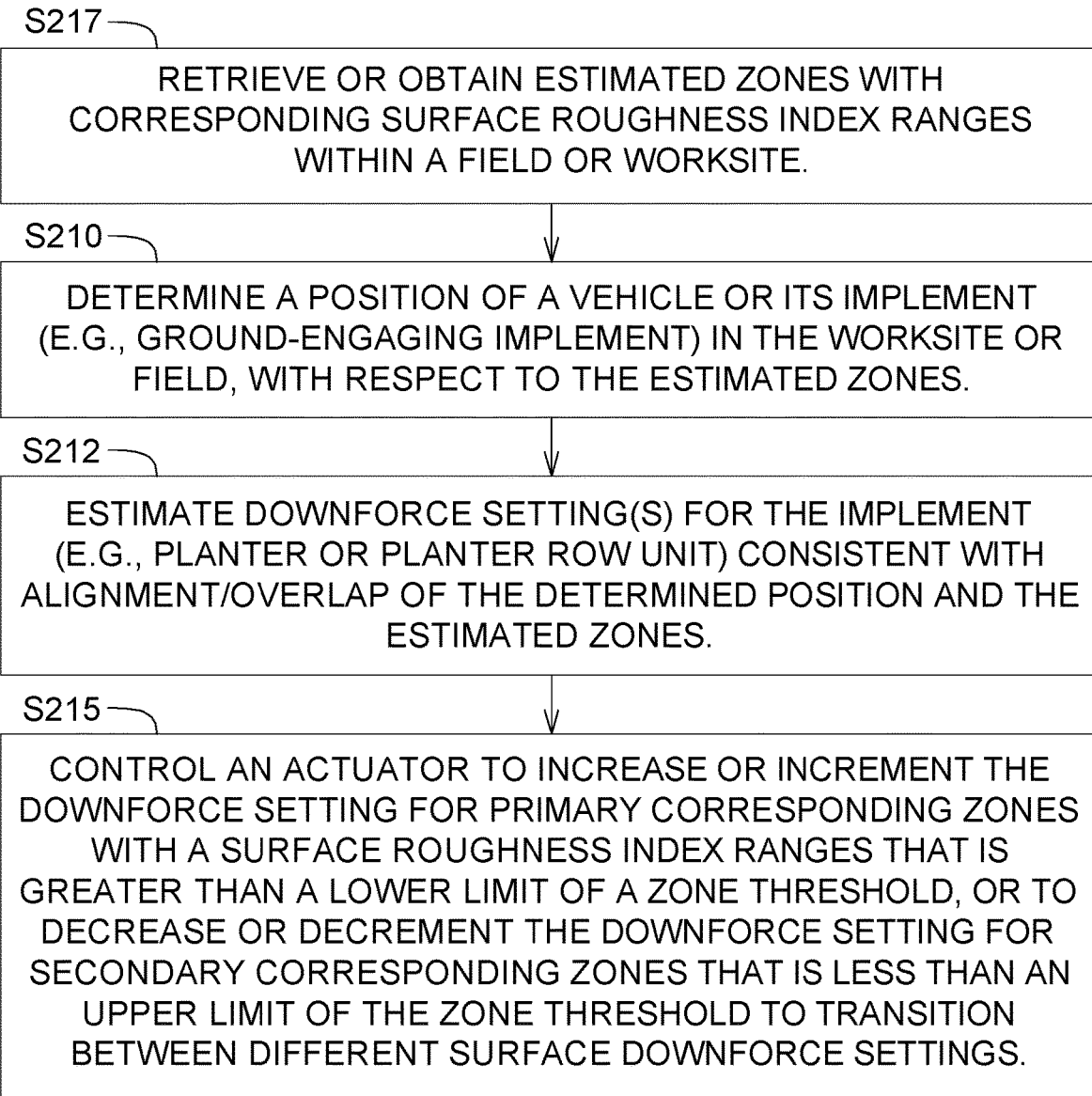
FIG. 2D is a flow chart of a fourth embodiment of a method for estimating surface roughness of ground for an off-road vehicle to control an implement.

FIG. 2D is a flow chart of a fourth embodiment of a method for estimating surface roughness of a ground for an off-road vehicle to control an implement. Like reference numbers in FIG. 2C and FIG. 2D indicate like steps or procedures.

In step S215, a electronic data processor 18 or down-force setting module controls an actuator to increase or increment the down-force setting for a primary corresponding zones with surface roughness index range that is greater than a lower limit of a zone threshold, or to decrease or decrement the down-force setting for a secondary corresponding zones that is are less than an upper limit of the zone threshold to transition between different down-force settings.

In an alternate embodiment, step S217 of FIG. 2D may be replaced by step S207 of FIG. 2B.

FIG. 2E is a flow chart of a fifth embodiment of a method for estimating surface roughness of a ground for an off-road vehicle to control an implement. Like reference numbers in FIG. 2C and FIG. 2D indicate like steps or procedures. The method of FIG. 2E is similar to the method of FIG. 2C, except the method of FIG. 2E further comprises image data enhancement of surface field roughness estimations. Like reference numbers in FIG. 2A through FIG. 2E, inclusive, indicate like steps, procedures or features.

In step S211, an imaging device (e.g., stereo camera) collects image data of the field or work site in a forward field of view of the vehicle. The forward field of view may include one or more cells or regions of the field or work site, along with one or more reference points (e.g., temporary two or three dimensional reference markers that can be removed or not displayed to an end user) that can augment or supplement the collected image data to facilitate aligning successive images to create (e.g., stitch together) an aggregate image.

In step S213, a data processor 18, surface roughness estimator 57, or visual surface roughness index estimator 32 estimates a visual surface roughness index for the collected image data within the field of view to establish a transition between different estimated down-force setting zones. For example, a data processor 18, surface roughness estimator 57, or visual surface roughness index estimator 32 estimates a visual surface roughness index for the collected image data within one or more regions or cells within a field of view to establish a transition (e.g., transition regions 311) between different estimated down-force setting zones (e.g., zones 308, 309, 310).

In step S216, prior to reaching a next transition region 311, the data processor 18, a down-force pressure estimator (e.g., down-force estimation module), or implement control module 60 estimates a next down-force setting for the implement (e.g., implement 83 or one or more row units 66) consistent with alignment and/or overlap of the determined position, the estimated zones (e.g., 308, 309, 310) and the established transition region(s) 311. For example, prior to reaching a next transition region 311 during a look-ahead preparation period, the data processor 18, a down-force pressure estimator 59 (e.g., down-force estimation module), or implement control module 60 or down-force estimation module estimates a next down-force setting for the implement (e.g., planter or one or more planter row units 66) consistent with alignment and/or overlap of the determined position, the estimated zones (e.g., 308, 309, 310) and the established transition region(s) 311.

In step S218, at the entrance point or beginning of the next transition region, a data processor 18, implement control module 60, and/or actuator controller 63 controls, directly or indirectly, an actuator (71, 72) to increase or increment the next down-force setting for one or more primary corresponding zones (e.g., 308, 309, 310) with a surface roughness index range that is greater than a limit (e.g., an upper limit) of a previous zone threshold (e.g., secondary zone threshold) that the vehicle, or its implement, is exiting. Alternately, or in any later sampling period, in step S218 at the entrance point or beginning of the next transition region, data processor 18, implement control module 60, and/or actuator controller 63 controls, directly or indirectly, an actuator (71, 72) to decrease or decrement the down-force setting for one or more secondary corresponding zones (e.g., 308, 309, 310) with a surface roughness index range that is less than a limit (e.g., a lower limit) of the previous zone threshold (e.g., primary zone threshold) to transition between the different surface down-force settings that the vehicle, or its implement, is exiting.

FIG. 3A is a plan view of a first illustrative data map 301 of surface roughness zones within a hypothetical field. FIG. 3A shows an illustrative path plan of a field in which the vehicle (e.g., 82) or the vehicle and its implement (e.g., 83) travels a circuitous path in generally parallel rows 302 (e.g., substantially linear segments) such that, in the aggregate after completing many rows, columns or passes, the swath or width of the implement covers a substantially an entire area within a field or work site. The field has boundaries, such as side edges 306 and end boundaries 307. As illustrated, at the end of each end boundary 307, the vehicle makes an end turn 303 of approximately one-hundred and eighty degrees to return to the next adjacent row. There may be no overlap of the swath of the vehicle or implement between adjacent rows 302, or there may be a slight overlap between adjacent rows 302 that assure that there is no or minimal gap in coverage where the implement is a sprayer, a planter or another device.

On the right side of the field, there is a keep-out area 305 (e.g., hazard), such as a waterway, wetland, swamp or drainage area, or channel that cannot be traversed by the vehicle or implement. Accordingly, the path plan and its path segments 304 are directed around the keep-out area 305.

In one configuration, the non-overlapping ranges may comprise one or more of the following: a first zone 308 associated with a first range of surface roughness index values bounded by a first lower limit and a first upper limit of surface roughness index; a second zone 309 associated with a second range of surface roughness index values bounded by a second lower limit and a second upper limit of surface roughness index, and a third zone 310 associated with a third range of surface roughness index values bounded by a third lower limit and a third upper limit of surface roughness index. In practice, it is understood that the non-overlapping ranges or zones (308, 309, 310) are not limited to any particular geometric shape; is some configurations the resolution of the non-overlapping regions or zones may comprise strips (e.g., of defined lengths in the direct of travel of the vehicle or implement) that are associated with one or more row units 66. The data map 301 of FIG. 3A may be stored in the memory of the data storage device 24 of the data processing system 14 or retrieved or accessed from a data storage device associated with a central server or the cloud via a wireless communications link or wireless communications network.

In one embodiment, the data processor 18 or the down-force pressure estimator (e.g., down-force estimation module) may estimate a corresponding down-force for each zone (308, 309, 310); and adjust the down-force to coincide with the zone in which the vehicle or its implement is currently traversing such that the planting depth of the seeds are kept substantially uniform throughout the field or work area, or are planted to a target depth within a target tolerance for the entire field or work area, if the target depth is allowed to vary per an agronomic prescription.

As illustrated in FIG. 3A and FIG. 3B, the first zone 308 is illustrated by cross-hatched regions or first strips along the path plan (e.g., for rows 302 and end turns 303) of the vehicle and its implement track; the second zone 309 is illustrated by regions or second strips without any cross-hatch fill pattern; and the third zone 310 is illustrated by cross-hatched regions or third strips along the path plan of the vehicle. For clarity the cross hatched regions of the first zone 308 are oriented in a different direction that the cross-hatched regions of the third zone 310.

FIG. 3B is a plan view of a second illustrative data map 321 of surface roughness zones (308, 309, 310); within a hypothetical field. Like reference numbers in FIG. 3A and FIG. 3B indicate like features or elements. The data map 321 of FIG. 3B is similar to the data map 301 of FIG. 3A, except the data map 321 of FIG. 3B has transition regions 311 between different zones of respective surface roughness index ranges.

Within each transition region 311, the data processor 18, the down-force pressure estimator 59 (e.g., down-force estimation module) and/or implement control module 60 is adjusting or changing the down-force from the target down-force requirements of the previous zone that is just exited to the down-force target requirements of next zone that is about to be entered. The longitudinal dimension (e.g., parallel or coincident to linear segments of rows 302) of the transition region 311 tends to vary with the speed of the vehicle, or its implement, in the direction of travel. The greater the ground speed of the vehicle, the shorter the longitudinal dimension of the transition region, and vice versa.

FIG. 4 is a perspective view of a off-road vehicle 82 that is towing a planting implement 83 of multiple row units 66 with adjustable down-force in accordance with a data map (301, 321) of surface roughness zones. Row units 66 are associated with the implement 83 that is coupled to the off-road vehicle 82.

FIG. 5 is a side view of one embodiment of a row unit 66, with adjustable down-force, of the planting implement of FIG. 4.

Each row unit 66 is mounted on a traverse member 67 by a bracket 68 that is spaced apart from a horizontal frame member 69. One or more arms 70 are pivotably connected to the bracket 68 and to the horizontal frame member 69 at pivot points 84 to allow the vertical height of the horizontal frame member 69 to vary (e.g., with respect to the ground) from the vertical height of the transverse member 67; hence, to allow for some adjustment in the down-force applied to any of the following: the closer 74, the planting disk 75, and the opener 79.

As illustrated an pneumatic cylinder 71 is secured to the bracket 68 at one end (or an upper bracket portion) and secured (e.g., pivotably attached) to one of the arms 70 on the opposite end to adjust the down-force applied to any of the following: the closer 74, the planting disk 75, and the opener 79; or alternately, or cumulatively, to allow for the adjustment of the depth of the planted seed or the seed tube 76.

In FIG. 5, a block diagram is associated with the pneumatic cylinder 71, where the block diagram comprises an actuator controller 63 that is coupled to an electro-pneumatic interface 64. The actuator controller 63 can be coupled to the data ports 16 of the data processing system 14 of FIG. 1A or FIG. 1B, for example. Meanwhile, the electro-pneumatic interface 64 may be associated with pneumatic system or pump to control the pressure or flow of air or nitrogen in the pneumatic cylinder 71 to control the planting depth or down-force of the row unit 66, or in tandem with one or more other row units 66 of the implement 83.

In one embodiment, a seed container 73 or seed hopper is supported by or above the horizontal frame member 69. The seed container 73 feeds seeds into a seed metering device 78 that is generally below the seed container 73. In some configurations, the seed metering device 78 meters or controls the spacing of the seeds based on or proportional to the ground speed of the planter.

In the front of the planter, there is an opener 79 or opening wheel 80 that opens a furrow or trench in the soil. Behind the opener 79, there is planting disk 75 that is associated with an end of a seed tube 76 or seed exit 77 in which seeds are dispensed into the opened furrow or trench in the soil. Behind the planting disk 75 and the seed exit 77, a closer 74 closes the trench or furrow or covers the planted seed with soil. As illustrated, the support 85 supports the opener 80, planting disk 75, and the closer 74.

FIG. 6 is a side view of another embodiment of a row unit 166, with adjustable down-force, of the planting implement of FIG. 5. Like reference numbers in FIG. 5 and FIG. 6 indicate like elements. the row unit 166 of FIG. 6 is similar the row unit 66 of FIG. 5, except the row unit 166 replaces the pneumatic cylinder 71 with a hydraulic cylinder 72.

As illustrated in FIG. 6, the hydraulic cylinder 72 is secured to the bracket 68 at one end (or to an upper bracket portion) and secured to one of the arms 70 on the opposite end to allow for some adjustment in the down-force applied to any of the following: the closer 74, the planting disk 75, and the opener 79; alternately or cumulatively, the allow for adjustment of the depth of the planted seed or the seed exit 77 of the seed tube 76.

In FIG. 6, a block diagram is associated with the hydraulic cylinder 72, where the block diagram comprises an actuator controller 63 that is coupled to an electro-hydraulic interface 65. The actuator controller 63 can be coupled to the data ports 16 of the data processing system 14 of FIG. 1A or FIG. 1B, for example. Meanwhile, the electro-hydraulic interface 65 may be associated with hydraulic system or pump to control the pressure or flow of hydraulic fluid in the hydraulic cylinder 72 to control the planting depth or down-force of the row unit 66, or in tandem with one or more other row units 66 of the implement 83.

The method and system of the disclosure is well-suited for accurate estimation and application of target down-force for an implement, its row units, or ground-engaging members of the implement, or its row units, to facilitate proper ground contact of the ground-engaging members with the soil or ground. For example, as the bumpiness or roughness of ground varies in certain zones or cells of a field or work site, the method and system supports automated and dynamic adjustment of the down-force to the implement, row unit or other ground-engaging members of the implement, rather than relying upon the operator to manually adjust down-force pressure in response to changing or variable conditions in the field or work site.

This document describes various illustrative embodiments which can be varied in many ways. Such variations are not to be regarded as a departure from the spirit and scope of illustrative embodiments, and all such variations or modifications as would be obvious to one skilled in the art are intended to be included within the scope of the claims.

The following is claimed:

1. A method for estimating surface roughness of a ground for an off-road vehicle to control an implement, the method comprising:
   detecting motion data of an off-road vehicle traversing a field or work site during a sampling interval, the motion data comprising ground speed of the off-road vehicle;
   detecting, by a first sensor or an inertial sensor module, pitch acceleration data of the off-road vehicle for the sampling interval;
   detecting, by a second sensor or the inertial sensor module, roll acceleration data of the off-road vehicle for the sampling interval;
   determining, by an electronic data processor, a surface roughness index based on the detected motion data, pitch acceleration data and roll acceleration data for the sampling interval;
   estimating zones with corresponding surface roughness index ranges within the field or work site based on the determined surface roughness index as the off-road vehicle traverses or traversed the field or work site over multiple sampling intervals;

generating a graphical display that illustrates the estimated zones of corresponding surface roughness or index ranges within the field or work site;

displaying, on a user interface, the generated graphical display to a user or operator of the off-road vehicle; and estimating a downforce setting for the implement of the off-road vehicle based on the determined surface roughness index to adjust the estimated down-force setting for one or more zone thresholds of a respective surface roughness index range of the estimated zone.

2. The method according to claim 1 further comprising:
determining a position of the off-road vehicle, or its implement, in the field or in the work site with respect to the estimated zones of different corresponding surface roughness index ranges; and estimating a down-force setting for the implement consistent with alignment and/or overlap of the determined position of the implement and the estimated zones to adjust the down-force setting with respect to a lower limit or an upper limit of a zone threshold.

3. The method according to claim 2 further comprising:
controlling an actuator to adjust the estimated down-force setting for corresponding zones with surface roughness index ranges for transitions or changes between different zone limits or zone thresholds.

4. The method according to claim 2 further comprising:
controlling an actuator to increase or increment the down-force setting for a primary corresponding zones with surface roughness index range that is greater than a lower limit of the zone threshold, or to decrease or decrement the down-force setting for a secondary corresponding zone that is less than an upper limit of the zone threshold to transition between different down-force settings.

5. The method according to claim 1 further comprising:
determining a position of a vehicle, or its implement, in the field or in the work site with respect to the estimated zones of different corresponding surface roughness index ranges; and estimating down-force settings associated with corresponding row units of the implement consistent with alignment and/or overlap of the determined position of the implement and the estimated zones, where different row units can have different down-force settings if the different row units of the implement fall within different estimated zones of the corresponding surface roughness ranges.

6. The method according to claim 1 further comprising:
collecting image data of the field or work site in a forward field of view of the vehicle;

estimating a visual surface roughness index for the collected image data within the field of view to establish a transition between different estimated down-force setting zones; and prior to reaching a next transition region, estimating a next down-force setting for the implement consistent with alignment and/or overlap of the determined position, the estimated zones and the established transition region.

7. The method according to claim 1 further comprising:
collecting image data of the field or work site in a forward field of view of the vehicle;

estimating a visual surface roughness index for the collected image data within the field of view to establish a transition between different estimated down-force setting zones; and at an entrance point or beginning of a next transition region, controlling an actuator to increase or increment a next down-force setting for one or more primary corresponding zones with a surface roughness index range that is greater than a limit of a previous zone threshold that the vehicle, or its implement, is exiting.

8. The method according to claim 1 further comprising:
collecting image data of the field or work site in a forward field of view of the vehicle;

estimating a visual surface roughness index for the collected image data within the field of view to establish a transition between different estimated down-force setting zones; and at an entrance point or beginning of a next transition region, controlling an actuator to decrease or decrement a down-force setting for one or more secondary corresponding zones with a surface roughness index range that is less than a limit of a previous zone threshold to transition between different surface down-force settings of the off-road vehicle, or its implement, that is exiting a previous zone.

9. A system for estimating surface roughness of a ground for an off-road vehicle to control an implement, the system comprising:

a motion sensor configured to detect motion data of an off-road vehicle traversing a field or work site during a sampling interval, the motion data comprising ground speed of the off-road vehicle;

a first sensor configured to detect pitch angular acceleration data of the off-road vehicle for the sampling interval;

a second sensor configured to detect roll angular acceleration data of the off-road vehicle for the sampling interval;

a surface roughness index estimator for determining a surface roughness index based on the detected motion data, pitch angular acceleration data and roll angular acceleration data for the sampling interval, where the surface roughness index estimator comprises software executable by an electronic data processor;

a user interface configured to display the surface roughness index to a user or operator of the off-road vehicle; and an electronic data processor configured to estimate a downforce setting for the implement of the off-road vehicle based on the determined surface roughness index to adjust the estimated down-force setting for one or more zone thresholds of a respective surface roughness index range of the estimated zone.

10. The system according to claim 9 further comprising:
a location-determining receiver for determining a position of the off-road vehicle, or its implement, in the field or in the work site with respect to the estimated zones of different corresponding surface roughness index ranges; and a down-force pressure estimator configured to estimate a down-force setting for the implement consistent with alignment and/or overlap of the determined position of the implement and the estimated zones.

11. The system according to claim 10 further comprising:
an implement control module or actuator controller configured to control an actuator to adjust the estimated down-force setting for corresponding zones with surface roughness index ranges for transitions or changes between different zone limits or zone thresholds.

12. The system according to claim 10 further comprising:
an implement control module or actuator controller configured to control an actuator to increase or increment the down-force setting for a primary corresponding zone with surface roughness index range that is greater than a lower limit of a zone threshold, or to decrease or decrement the down-force setting for a secondary corresponding zone that is are less than an upper limit of the zone threshold to transition between different down-force settings.

13. The system according to claim 9 further comprising:
a plurality of row units associated with the implement;
a location-determining receiver for determining a position of the off-road vehicle, or its implement, in the field or in the work site with respect to the estimated zones of different corresponding surface roughness index ranges; and
a down-force pressure estimator configured to estimate down-force settings associated with the corresponding row units of the implement consistent with alignment and/or overlap of the determined position of the implement and the estimated zones, where different row units can have different down-force settings if the different row units of the implement fall within different estimated zones of the corresponding surface roughness ranges.

14. The system according to claim 9 further comprising:
an imaging system for collecting image data of the field or work site in a forward field of view of the vehicle;
a visual surface roughness estimator configured to estimate a visual surface roughness index for the collected image data within the field of view to establish a transition between different estimated down-force setting zones; and
a down-force pressure estimator configured to estimate a next down-force setting for the implement consistent with alignment and/or overlap of the determined position, the estimated zones and the established transition region prior to reaching a next transition region.

15. The system according to claim 9 further comprising:
an imaging system for collecting image data of the field or work site in a forward field of view of the vehicle;
a visual surface roughness estimator configured to estimate a visual surface roughness index for the collected image data within the field of view to establish a transition between different estimated down-force setting zones; and
at an entrance point or beginning of a next transition region, an implement control module or actuator controller configured to control an actuator to increase or increment a next down-force setting for one or more primary corresponding zones with a surface roughness index range that is greater than a limit of a previous zone threshold that the vehicle, or its implement, is exiting.

16. The system according to claim 9 further comprising:
an imaging system configured to collect image data of the field or work site in a forward field of view of the vehicle;
a visual surface roughness index estimator configured to estimate a visual surface roughness index for the collected image data within the field of view to establish a transition between different estimated down-force setting zones; and
at an entrance point or beginning of a next transition region, an implement control module or actuator controller configured to control an actuator to decrease or decrement a down-force setting for one or more secondary corresponding zones with a surface roughness index range that is less than a limit of a previous zone threshold to transition between different surface down-force settings of the off-road vehicle, or its implement, that is exiting a previous zone.

17. A system for estimating surface roughness of a ground for an off-road vehicle to control an implement, the system comprising:
a motion sensor configured to detect motion data of an off-road vehicle traversing a field or work site during a sampling interval, the motion data comprising ground speed of the off-road vehicle;
a first sensor configured to detect pitch angular acceleration data of the off-road vehicle for the sampling interval;
a second sensor configured to detect roll angular acceleration data of the off-road vehicle for the sampling interval;
a surface roughness index estimator for determining a surface roughness index based on the detected motion data, pitch angular acceleration data and roll angular acceleration data for the sampling interval, where the surface roughness index estimator comprises software executable by an electronic data processor;
a user interface configured to display the surface roughness index to a user or operator of the off-road vehicle; and
an electronic data processor configured to estimate a downforce setting for the implement of the off-road vehicle based on the determined surface roughness index to adjust the estimated down-force to coincide with a zone of surface roughness index range in which the vehicle or its implement is currently traversing such that the planting depth of the seeds are at a target depth within a target tolerance for the field or a work area of the field.

18. The system according to claim 17 further comprising:
a location-determining receiver for determining a position of the off-road vehicle, or its implement, in the field or in the work site with respect to the estimated zones of different corresponding surface roughness index ranges; and
a down-force pressure estimator configured to estimate a down-force setting for the implement consistent with alignment and/or overlap of the determined position of the implement and the estimated zones.

19. The system according to claim 18 further comprising:
an implement control module or actuator controller configured to control an actuator to adjust the estimated down-force setting for corresponding zones with surface roughness index ranges for transitions or changes between different zone limits or zone thresholds.

20. The system according to claim 17 further comprising:
an implement control module or actuator controller configured to control an actuator to increase or increment the down-force setting for a primary corresponding zone with surface roughness index range that is greater than a lower limit of a zone threshold, or to decrease or decrement the down-force setting for a secondary corresponding zone that is are less than an upper limit of the zone threshold to transition between different down-force settings.

* * * * *